US012791378B2

(12) United States Patent
Asakura

(10) Patent No.: US 12,791,378 B2
(45) Date of Patent: Nov. 10, 2026

(54) DETECTION DEVICE

(71) Applicant: Magnolia White Corporation, Tokyo (JP)

(72) Inventor: Shinya Asakura, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 76 days.

(21) Appl. No.: 19/048,053

(22) Filed: Feb. 7, 2025

(65) Prior Publication Data

US 2025/0264358 A1 Aug. 21, 2025

(30) Foreign Application Priority Data

Feb. 15, 2024 (JP) ................................ 2024-020777

(51) Int. Cl.
*G01J 1/04* (2006.01)
*G01J 1/08* (2006.01)
*G01J 1/16* (2006.01)

(52) U.S. Cl.
CPC ................ *G01J 1/044* (2013.01); *G01J 1/08* (2013.01); *G01J 1/16* (2013.01); *G01J 2001/1694* (2013.01)

(58) Field of Classification Search
CPC ...... G01J 1/044; G01J 1/08; G01J 1/16; G01J 2001/1694; C12M 41/36
See application file for complete search history.

(56) References Cited

U.S. PATENT DOCUMENTS 12,462,598 B2 * 11/2025 Mochizuki ............ H10K 59/60
12,638,633 B2 * 5/2026 Araki .................. G02B 6/0043
12,652,471 B2 * 6/2026 Ishihara ................ H04N 23/84

FOREIGN PATENT DOCUMENTS

JP 6830593 B2 2/2021

* cited by examiner

*Primary Examiner* — Tony Ko
(74) *Attorney, Agent, or Firm* — K&L Gates LLP

(57) ABSTRACT

According to an aspect, a detection device includes: a light source device; an object placement member on which an object to be detected is placed; a liquid crystal shutter having divided regions; and an optical sensor having detection regions arranged in a plane. One of the detection regions includes one or more photodetection elements. The light source device includes a light-shielding wall disposed between two adjacent light-emitting elements out of the light-emitting elements. The divided regions in the liquid crystal shutter are each capable of being switched between a light-transmitting state and a non-light-transmitting state for each of the divided regions, and the light-emitting elements are each capable of being switched between a lit state and an unlit state for each of the light-emitting elements. The respective light-emitting elements, the respective divided regions of the liquid crystal shutter, and the respective detection regions overlap when viewed in the first direction.

10 Claims, 17 Drawing Sheets

DETECTION DEVICE

CROSS-REFERENCE TO RELATED APPLICATION

This application claims the benefit of priority from Japanese Patent Application No. 2024-020777 filed on Feb. 15, 2024, the entire contents of which are incorporated herein by reference.

BACKGROUND

1. Technical Field

What is disclosed herein relates to a detection device.

2. Description of the Related Art

Japanese Patent Publication No. 6830593 (JP-B-6830593) discloses a biosensor that includes an optical sensor including a photosensor (photodetection element), a culture vessel placed on the upper side of an imaging surface of the photosensor, and a point light source disposed above the culture vessel. The culture vessel accommodates therein a culture medium and a plurality of objects to be detected (microorganisms). In the biosensor of JP-B-6830593, light emitted from the point light source passes through the culture medium and the objects to be detected (microorganisms), and enters the photodiode. If a plurality of point light sources are provided to the biosensor according to JP-B-6830593, one object to be detected is irradiated with light rays in different directions from the point light sources, which may blur an image captured by the optical sensor.

Detection devices with higher accuracy of detection of the objects to be detected are required.

For the foregoing reasons, there is a need for a detection device that improves accuracy of detection of objects to be detected.

SUMMARY

According to an aspect, a detection device includes: a light source device including a plurality of light-emitting elements arranged in a plane; an object placement member with a light-transmitting property disposed overlapping the light source device on a first side in a first direction and on which an object to be detected is placed; a liquid crystal shutter that is disposed overlapping the object placement member on the first side in the first direction and has a plurality of divided regions arranged in a plane; and an optical sensor that is disposed overlapping the liquid crystal shutter on the first side in the first direction and has a plurality of detection regions arranged in a plane. One of the detection regions includes one or more photodetection elements. The light source device includes a light-shielding wall disposed between two adjacent light-emitting elements out of the light-emitting elements. The divided regions in the liquid crystal shutter are each capable of being switched between a light-transmitting state and a non-light-transmitting state for each of the divided regions, and the light-emitting elements are each capable of being switched between a lit state and an unlit state for each of the light-emitting elements. The respective light-emitting elements, the respective divided regions of the liquid crystal shutter, and the respective detection regions overlap when viewed in the first direction.

DETAILED DESCRIPTION

Figure 1:
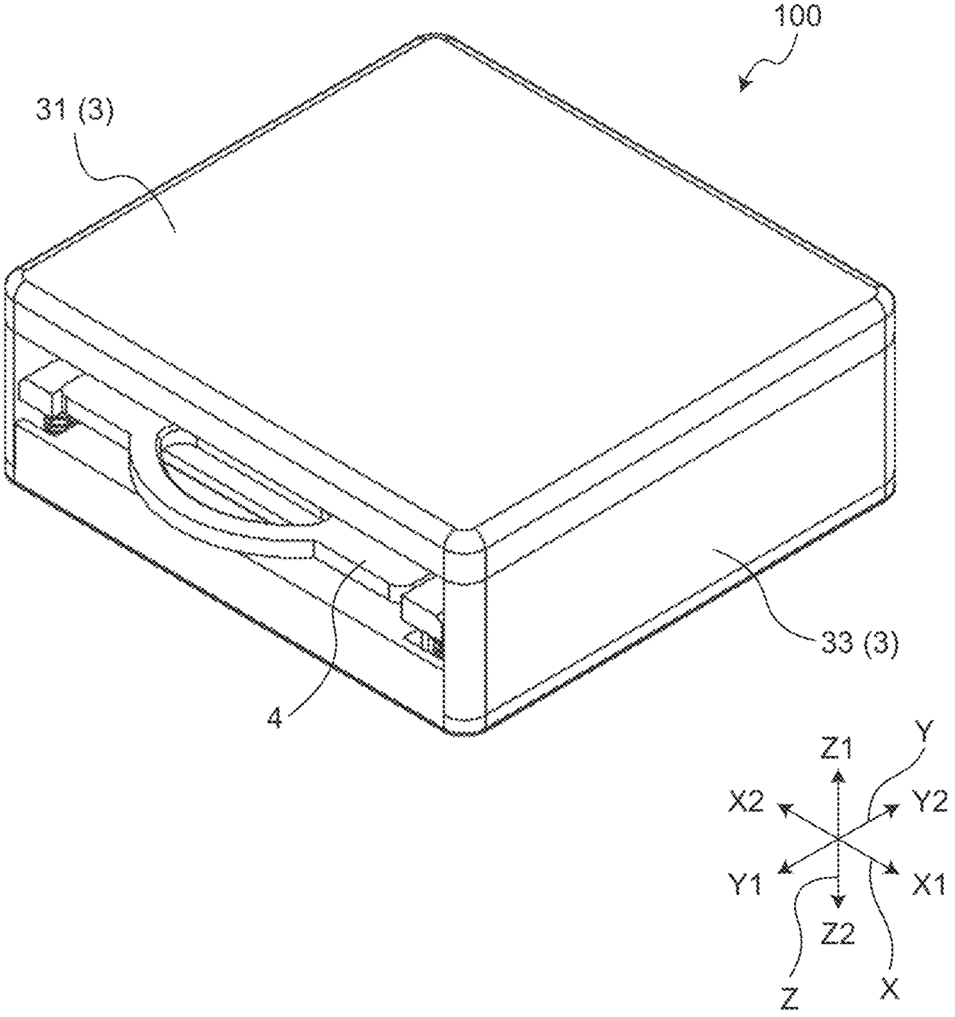
FIG. 1 is a perspective view schematically illustrating a detection device according to an embodiment of the present disclosure.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure.

To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In XYZ coordinates in the drawings, a Z direction (first direction) corresponds to the up-down direction; an X direction (second direction) corresponds to the right-left direction; and a Y direction (third direction) corresponds to the front-rear direction. The X direction intersects (at right angles) the Y and Z directions; the Y direction intersects (at right angles) the X and Z directions; and the Z direction intersects (at right angles) the X and Y directions. A Z1 side is one side in the first direction, and a Z2 side is the other side in the first direction. A plan view indicates a state viewed in the Z direction (first direction).

Figure 2:
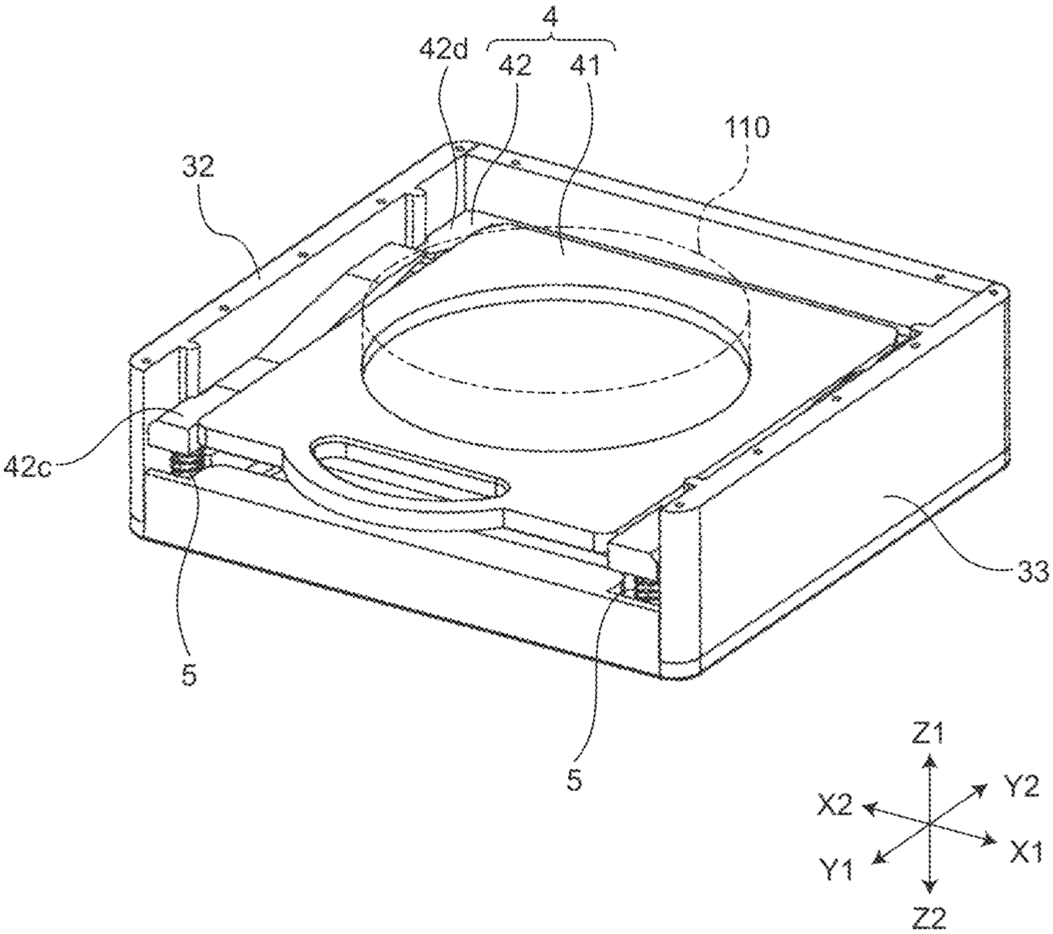
FIG. 2 is a perspective view of a state where a top plate is removed from FIG. 1.

FIG. 1 is a perspective view schematically illustrating a detection device according to an embodiment of the present disclosure. FIG. 2 is a perspective view of a state where a top plate is removed from FIG. 1.

As illustrated in FIGS. 1 and 2, a detection device 100 has a substantially box shape, for example. The detection device 100 includes a housing 3 and a holding member 4. The housing 3 includes a top plate 31 and side plates 32 and 33. The holding member 4 includes a plate 41 and a base plate 42. An object placement member 110 is placed on the plate 41. The four corners of the base plate 42 are provided with front-side holders 42*c* and rear-side holders 42*d*. The front-side holders 42*c* and the rear-side holders 42*d* are biased to the upper side (Z1 side) by springs 5. The object placement member 110 is placed on the plate 41, whereby the plate 41 and the object placement member 110 are biased to the upper side (Z1 side) by the springs 5.

Figure 3:
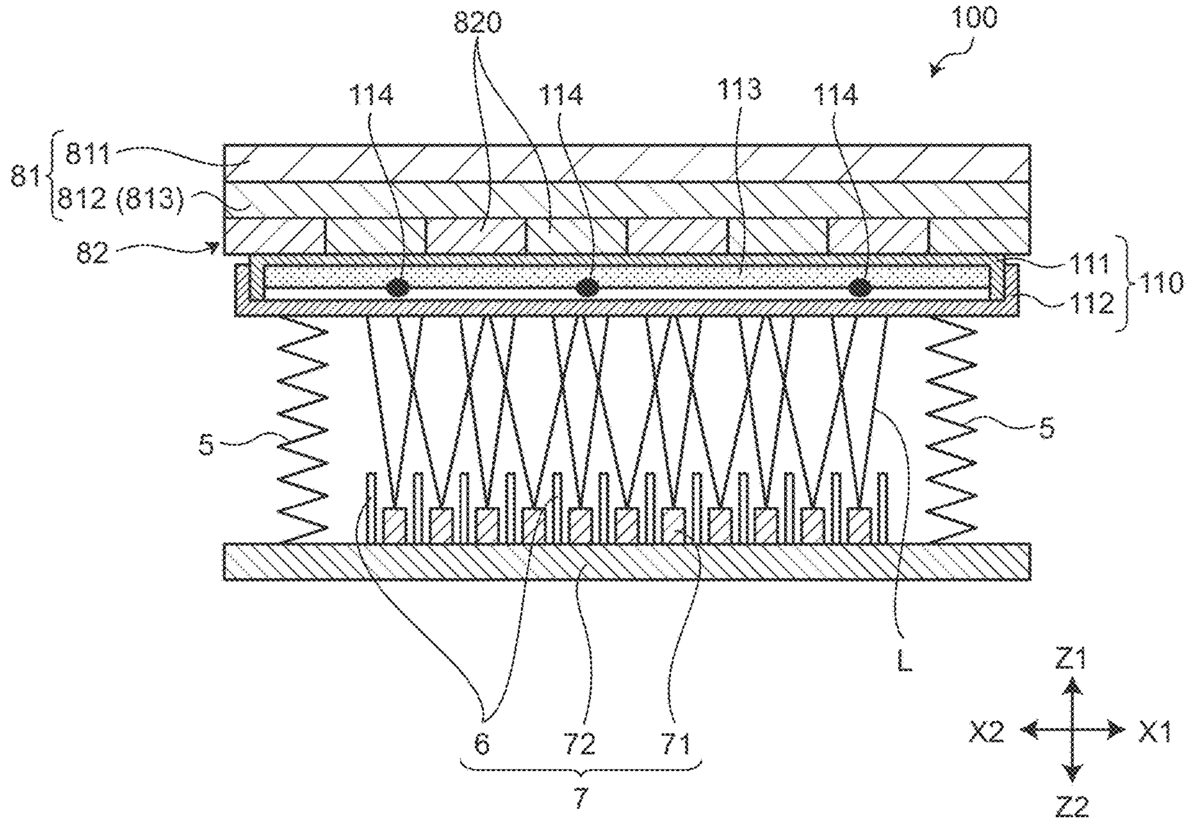
FIG. 3 is a schematic view of the detection device according to the embodiment.

FIG. 3 is a schematic view of the detection device according to the embodiment. As illustrated in FIG. 3, the detection device 100 includes a light source device 7, the object placement member 110, a liquid crystal shutter 82, an optical sensor 81, and the springs 5.

The light source device 7 includes a light source substrate 72, a plurality of light-emitting elements 71, and a light-shielding wall 6. The light-emitting element 71 is a light-emitting diode (LED), for example. The light-emitting elements 71 are provided on the light source substrate 72. Thus, the light source device 7 includes a plurality of light-emitting elements 71 arranged in a plane. The light-shielding wall 6 separates the light-emitting elements 71 from each other.

The object placement member 110 includes a placement substrate 111 and a cover member 112. The object placement member 110 is a Petri dish, for example. The object placement member 110 has a light-transmitting property. The placement substrate 111 is a light-transmitting substrate disposed overlapping the light source device 7 on the Z1 side and on which objects to be detected 114 are placed.

The object placement member 110 according to the present embodiment is placed upside down with respect to a conventional object placement member. In other words, in the conventional object placement member, the placement substrate is placed on the lower side, and the cover member is placed on the upper side. By contrast, in the object placement member 110 according to the present embodiment, the placement substrate 111 is placed on the upper side, and the cover member 112 is placed on the lower side. The optical sensor 81 and the liquid crystal shutter 82 are provided on top of (on the Z1 side of) the object placement member 110 placed upside down, and the light source device 7 is provided under (on the Z2 side of) it. A culture medium 113 is provided under the placement substrate 111, and the objects to be detected 114 are applied to the culture medium 113 (lower surface of the culture medium 113). The object to be detected 114 is a microorganism, such as a bacterium, or a sample containing a microorganism and forms colonies on the culture medium 113 over time. The object to be detected 114 is not limited to the bacteria, and may be other micro-objects such as cells.

The optical sensor 81 includes an array substrate 811 and sensor pixels 812 (photodetection elements 813 or photodiodes). The optical sensor 81 is disposed overlapping the liquid crystal shutter 82 on the Z1 side. The sensor pixels 812 are provided on the surface of the array substrate 811 on the Z2 side. The liquid crystal shutter 82 will be described later.

Light L emitted from the light-emitting element 71 passes through the cover member 112, the culture medium 113, the placement substrate 111, and a divided region of the liquid crystal shutter 82 in a light-transmitting state (open state) and travels toward the optical sensor 81. The amount of light incident on the photodetection element 813 (photodiode) of the optical sensor 81 differs between a region overlapping the object to be detected 114 and a region not overlapping the object to be detected 114. As a result, the optical sensor 81 can image the objects to be detected 114. Thus, the detection device 100 is a device that monitors changes in the objects to be detected 114 by placing the objects to be detected 114 accommodated in the object placement member 110 between the light source device 7 and the optical sensor 81 and imaging the objects to be detected 114 by the optical sensor 81.

Figure 4:
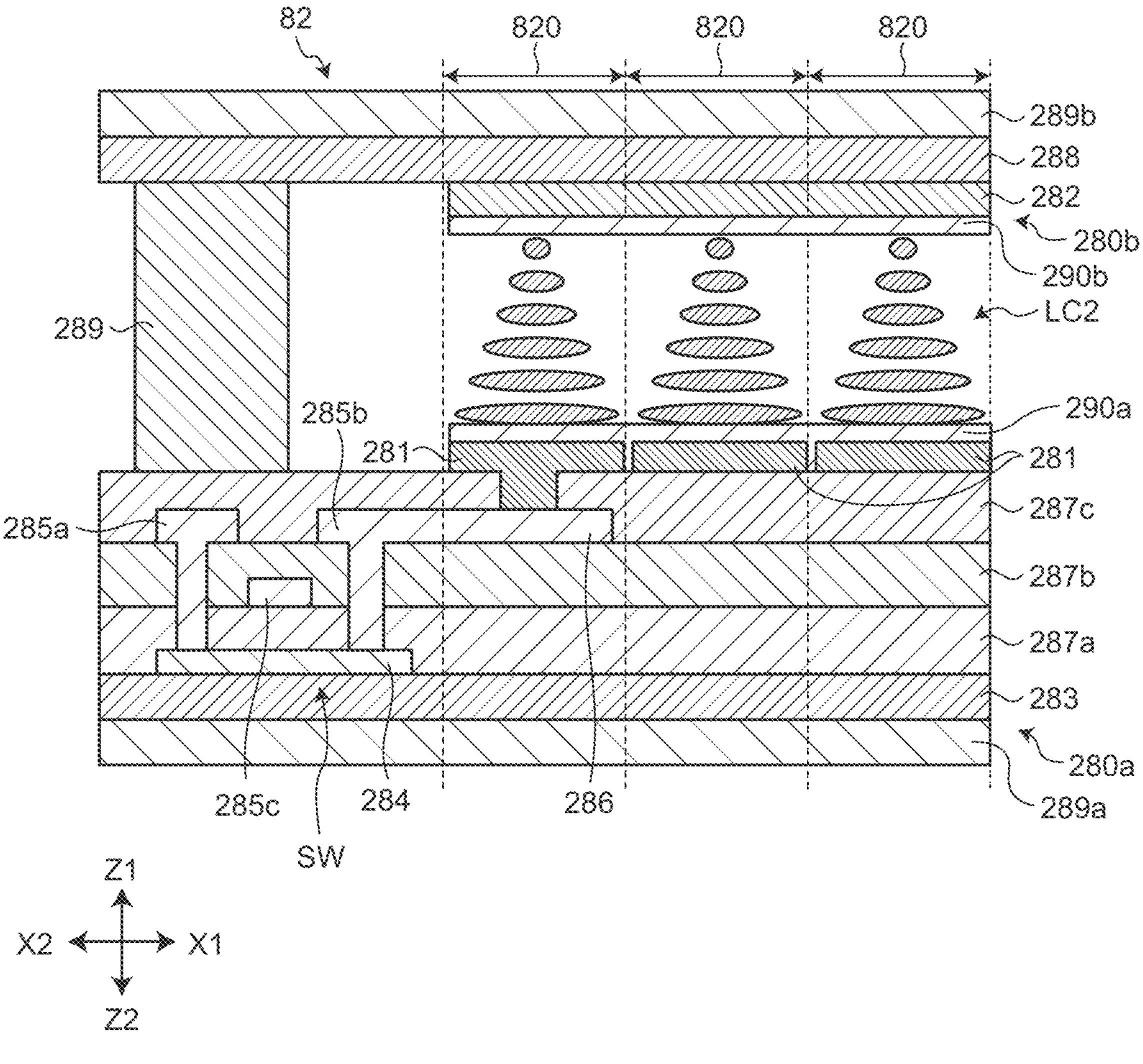
FIG. 4 is a schematic view of a section of a liquid crystal shutter according to the embodiment.

FIG. 4 is a schematic view of a section of the liquid crystal shutter according to the embodiment. The twisting state of liquid crystal molecules of the liquid crystal shutter 82 is controlled by setting a voltage applied to electrodes to be on or off, whereby the liquid crystal shutter 82 can transmit or block light with a polarizing plate provided on the light emitting side of a liquid crystal layer LC2 from which the light is emitted. FIG. 4 illustrates three divided regions 820 divided in the X direction.

The liquid crystal shutter 82 includes a first substrate 280*a*, a second substrate 280*b*, and the liquid crystal layer LC2. Specifically, the second substrate 280*b* is disposed on the Z1 side of the first substrate 280*a* with a gap interposed therebetween, and the liquid crystal layer LC2 is provided between the second substrate 280*b* and the first substrate 280*a*.

The first substrate 280*a* includes a first polarizing plate 289*a*, a first transparent substrate 283, an insulating layer 287*a*, an insulating layer 287*b*, an insulating layer 287*c*, first electrodes 281, and a first orientation film 290*a*. Specifically, the first polarizing plate 289*a*, the first transparent substrate 283, the insulating layer 287*a*, the insulating layer 287*b*, the insulating layer 287*c*, the first electrodes 281, and the first orientation film 290*a* are stacked in this order from the Z2 side to the Z1 side.

The second substrate 280*b* includes a second polarizing plate 289*b*, a second transparent substrate 288, a second electrode 282, and a second orientation film 290*b*. Specifically, the second polarizing plate 289*b*, the second transparent substrate 288, the second electrode 282, and the second orientation film 290*b* are stacked in this order from the Z1 side to the Z2 side.

The first polarizing plate 289*a* and the second polarizing plate 289*b* are polarizing plates that transmit light of the component in incident light that oscillates in a predetermined direction and block light of the component that oscillates in any direction other than the predetermined direction.

The first transparent substrate 283 and the second transparent substrate 288 are glass substrates, for example. The first electrode 281 and the second electrode 282 are light-transmitting electrodes made of indium tin oxide (ITO), for example. The first orientation film 290*a* and the second orientation film 290*b* are made of polyimide (PI), for example. The orientation film is provided to control the orientation of liquid crystal molecules when the liquid crystal molecules are required to be aligned in one direction over a certain large area.

The liquid crystal shutter 82 includes a switch SW composed of a thin-film transistor (TFT), for example. The switch SW includes a channel 284, a source 285*a*, a drain 285*b*, and a gate 285*c* mounted on the first transparent substrate 283 of the first substrate 280*a*. The source 285*a* is supplied with a potential based on a local dimming signal. The drain 285*b* is electrically coupled to wiring 286. The switch SW switches between a state in which a drain current flows to the first electrode 281 and a state in which the drain current does not flow thereto, depending on the presence or absence of a signal supplied to the gate 285*c*. Each divided region 820 is provided with the first electrode 281, the second electrode 282, and one switch SW.

Figure 5:
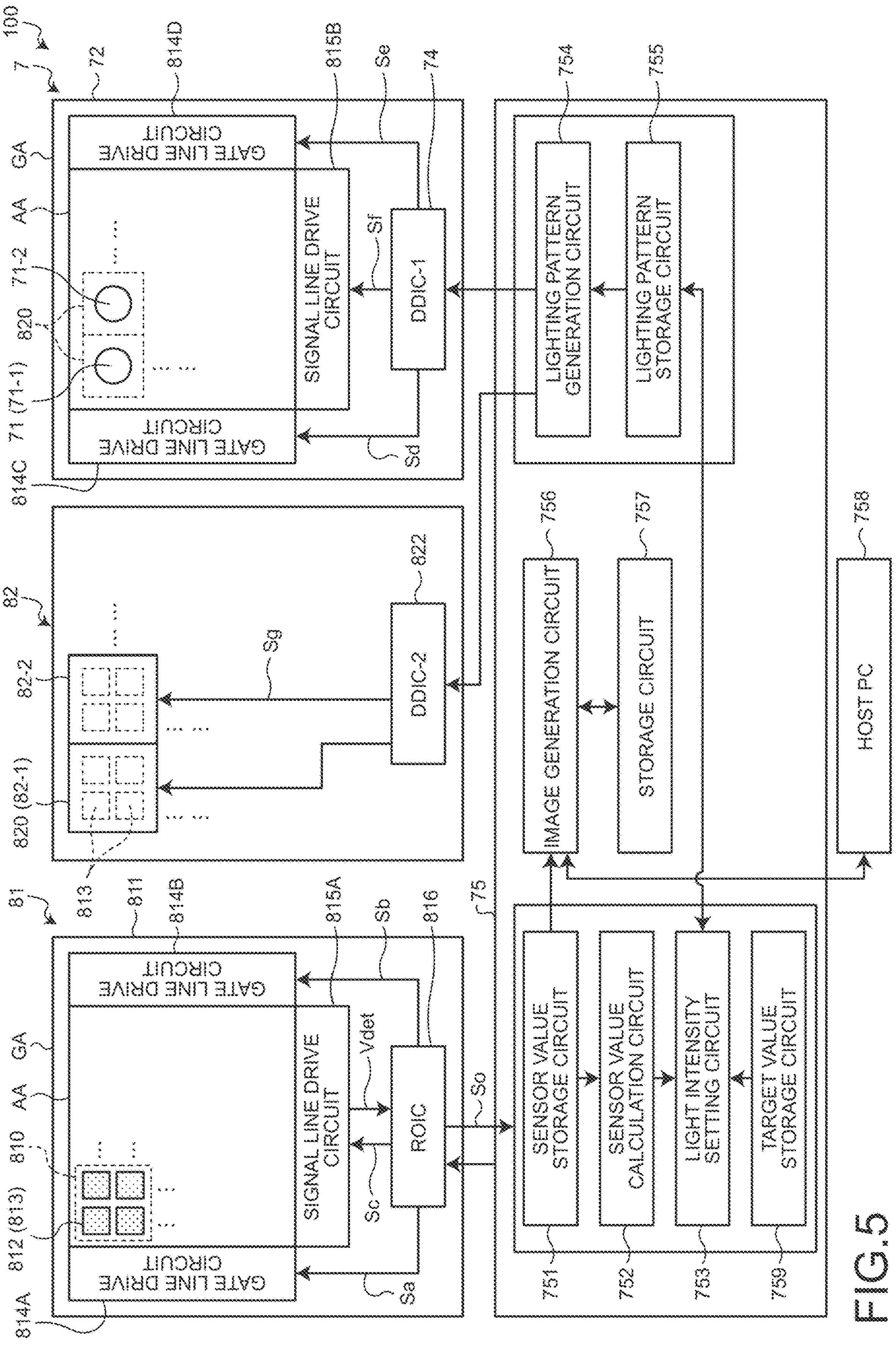
FIG. 5 is a block diagram illustrating an example of the configuration of the detection device.

FIG. 5 is a block diagram illustrating an example of the configuration of the detection device. As illustrated in FIG. 5, the detection device 100 includes the optical sensor 81, the liquid crystal shutter 82, the light source device 7, and a host IC 75. The optical sensor 81 includes the array substrate 811, the sensor pixels 812 (photodetection elements 813 or photodiodes) formed on the array substrate 811, gate line drive circuits 814A and 814B, a signal line drive circuit 815A, and a detection control circuit (ROIC) 816.

The array substrate 811 is formed using a substrate as a base. Each of the sensor pixels 812 is configured with a corresponding one of the photodetection elements 813, a plurality of transistors, and various types of wiring.

The array substrate 811 has a detection region AA and a peripheral region GA. The detection region AA is a region provided with the sensor pixels 812 (photodetection elements 813). The peripheral region GA is a region between the outer periphery of the detection region AA and the outer ends of the array substrate 811 and is a region not provided with the sensor pixels 812. The gate line drive circuits 814A and 814B, the signal line drive circuit 815A, and the detection control circuit 816 are provided in the peripheral region GA.

Each of the sensor pixels 812 is an optical sensor that includes the photodetection element (photodiode) 813 as a sensor element. Each of the photodetection elements 813 outputs an electrical signal corresponding to light emitted thereto.

The detection control circuit 816 is a circuit that supplies control signals Sa, Sb, and Sc to the gate line drive circuits 814A and 814B and the signal line drive circuit 815A, respectively, to control operations of these circuits. The detection control circuit 816 includes a signal processing circuit that performs signal processing on detection signals Vdet from the photodetection elements 813.

The detection control circuit 816 performs signal processing on the detection signals Vdet from the photodetection elements 813 and outputs sensor values So based on the detection signals Vdet to the host IC 75. Thus, the detection device 100 detects information on the object to be detected 114.

The liquid crystal shutter 82 includes a plurality of divided regions 820 and a second light-emitting element control circuit (DDIC-2) 822. Each of the divided regions 820 is arranged overlapping a plurality of (e.g., four) photodetection elements 813. The second light-emitting element control circuit 822 supplies control signals Sg to the respective divided regions 820 and controls operations of these regions. The divided region 820 of the liquid crystal shutter 82 overlaps the photodetection elements 813 when viewed in the Z direction. In the present embodiment, the number of the light-emitting elements 71 overlapping one divided region 820 of the liquid crystal shutter 82 may be two or more.

The light source device 7 includes the light source substrate 72, the light-emitting elements 71 formed on the light source substrate 72, gate line drive circuits 814C and 814D, a signal line drive circuit 815B, and a first light-emitting element control circuit (DDIC-1) 74.

The light-emitting elements 71 are arranged in a matrix (row-column configuration) in a region of the light source substrate 72 overlapping the detection region AA. The light source substrate 72 is a drive circuit substrate that drives each of the light-emitting elements 71 so as to switch the state of the element between on (lit state) and off (unlit state). The light-emitting elements 71 are disposed overlapping the respective divided regions 820 of the liquid crystal shutter 82. In other words, the respective light-emitting elements 71, the respective divided regions 820 of the liquid crystal shutter 82, and respective detection regions 810 overlap when viewed in the Z direction.

The first light-emitting element control circuit 74 supplies control signals Sd, Se, and Sf to the gate line drive circuits 814C and 814D and the signal line drive circuit 815B, respectively, to control operations of these circuits.

The host IC 75 includes, as a control circuit for the optical sensor 81, a sensor value storage circuit 751, a sensor value calculation circuit 752, a light intensity setting circuit 753, and a target value storage circuit 759. The sensor value storage circuit 751 stores therein the sensor values So output from the detection control circuit 816 of the optical sensor 81. The sensor value calculation circuit 752 performs a predetermined calculation process on the sensor values So of the photodetection elements 813.

In a light intensity setting mode, the light intensity setting circuit 753 compares the sensor values So detected by the photodetection elements 813 with a preset target sensor value So-t acquired from the target value storage circuit 759 to set light intensities of the light-emitting elements 71 for detection. The target value storage circuit 759 stores therein the preset target sensor value So-t.

The host IC 75 includes, as a control circuit for the light source device 7, a lighting pattern generation circuit 754 and a lighting pattern storage circuit 755. The lighting pattern storage circuit 755 stores therein information on the light intensity of each of the light-emitting elements 71 in the light intensity setting mode.

The lighting pattern generation circuit 754 generates various control signals based on the information on the light intensity in the lighting pattern storage circuit 755.

The host IC 75 includes an image generation circuit 756 and a storage circuit 757. In a detection mode, the image generation circuit 756 generates an image of the object to be detected 114, based on the sensor values So output from the photodetection elements 813. The storage circuit 757 stores therein image data generated by the image generation circuit 756. The host IC 75 is coupled to a host computer (PC) 758 and transfers the image data to the host PC 758.

Figure 6:
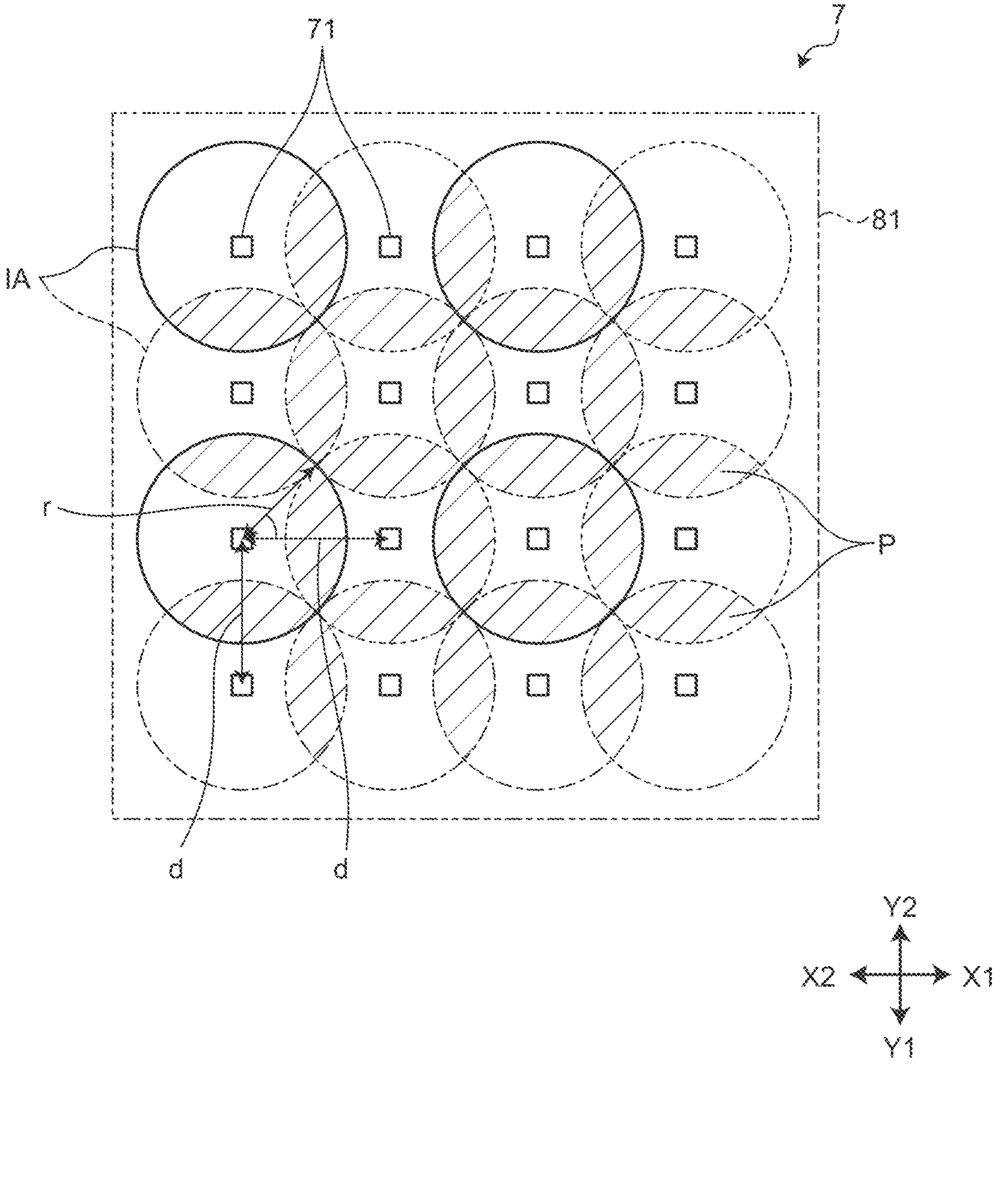
FIG. 6 is a schematic view illustrating projection regions of light emitted from light-emitting elements.

FIG. 6 is a schematic view illustrating projection regions of light emitted from the light-emitting elements.

As illustrated in FIG. 6, a total of 16 light-emitting elements 71 according to the present embodiment are provided. The 16 light-emitting elements 71 are arranged in a matrix (row-column configuration) at regular intervals in the X direction (second direction) and the Y direction (third direction). In the 16 light-emitting elements 71, the distance between the light-emitting elements 71 adjacent to each other in the X direction is a distance d, and the distance between the light-emitting elements 71 adjacent to each other in the Y direction is also the distance d.

Light emitted from one light-emitting element 71 spreads radially as the light travels toward the upper side (Z1 side). Therefore, as illustrated in FIG. 6, a projection region IA of light projected onto the optical sensor 81 without the liquid crystal shutter 82 is a circle with a radius r centered on the light-emitting element 71. As illustrated in FIG. 6, the projection regions IA adjacent in the X or Y direction have an overlapping portion P indicated by hatching. This overlapping portion P causes the image of the object to be detected 114 to be blurred or hazy.

Figure 7:
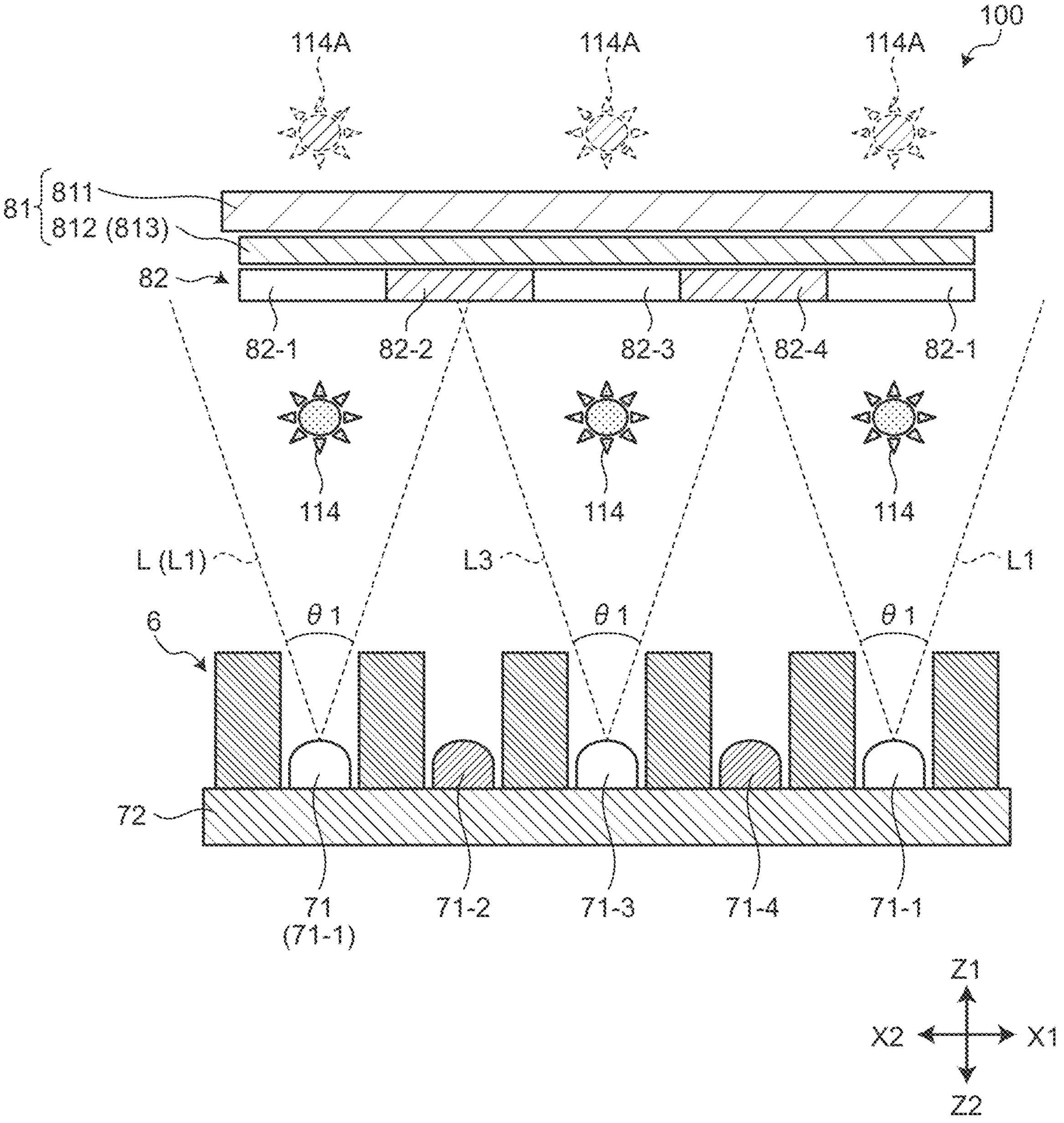
FIG. 7 is a schematic view of the detection device according to the embodiment viewed from the side.
Figure 8:
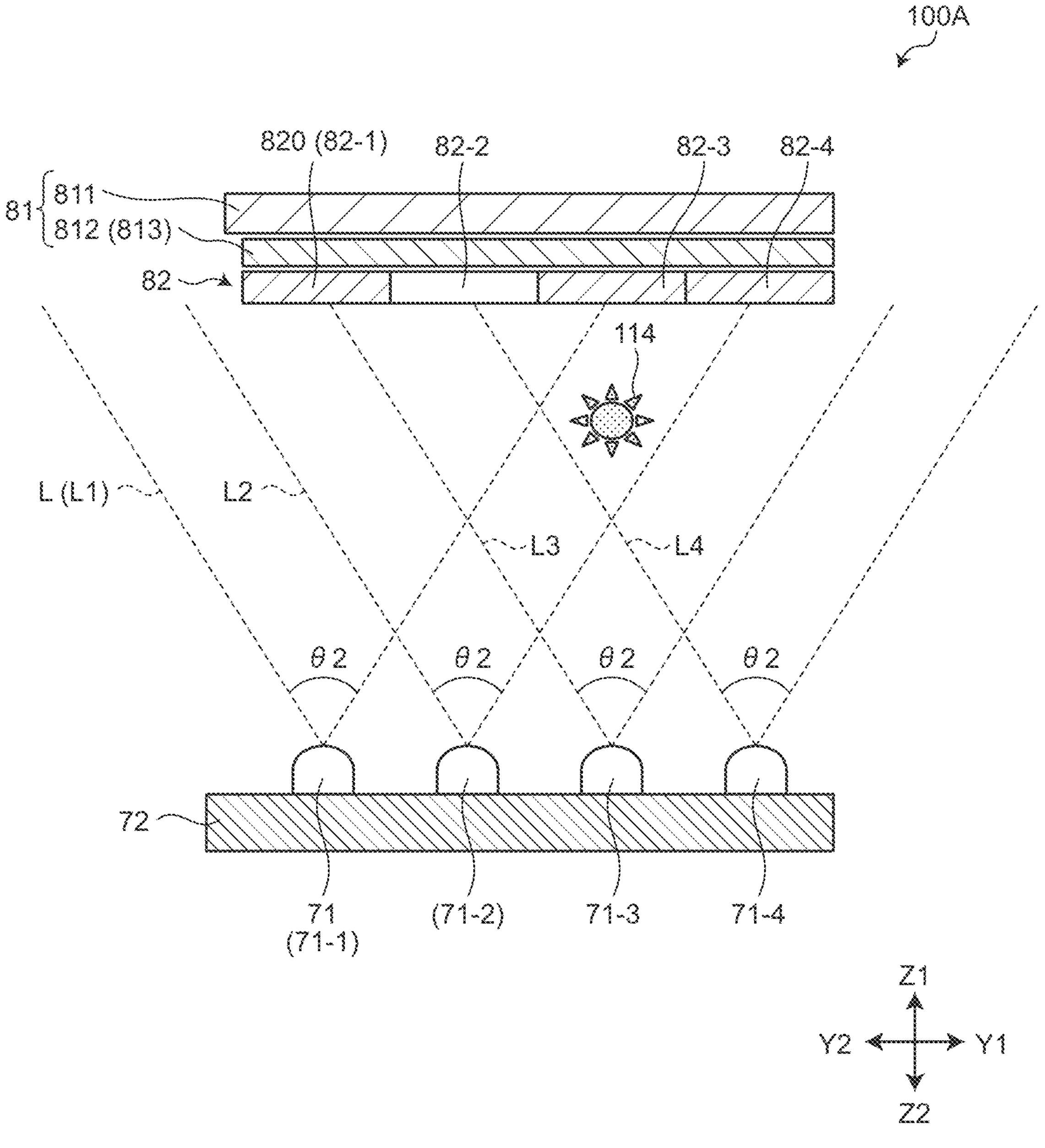
FIG. 8 is a schematic view of a detection device according to a comparative example viewed from the side.

FIG. 7 is a schematic view of the detection device according to the embodiment viewed from the side. FIG. 8 is a schematic view of a detection device according to a comparative example viewed from the side.

First, the comparative example illustrated in FIG. 8 is described. In the comparative example illustrated in FIG. 8, the light-shielding wall 6 illustrated in FIG. 7 is not provided. As illustrated in FIG. 8, a divided region 82-1 overlaps a light-emitting element 71-1, a divided region 82-2 overlaps a light-emitting element 71-2, a divided region 82-3 overlaps a light-emitting element 71-3, and a divided region 82-4 overlaps a light-emitting element 71-4 when viewed in the Z direction. Light L1 is emitted from the light-emitting element 71-1, light L2 is emitted from the light-emitting element 71-2, light L3 is emitted from the light-emitting element 71-3, and light L4 is emitted from the light-emitting element 71-4. As illustrated in FIG. 8, the light L1 is incident on the entire area of the divided region 82-1, the entire area of the divided region 82-2, and part of the divided region 82-3 in the comparative example. Similarly, the light L2 is incident on the entire area of the divided region 82-2, the entire area of the divided region 82-1, the entire area of the divided region 82-3, and part of the divided region 82-4. In the comparative example not provided with the light-shielding wall 6, the irradiation angle of light emitted from the light-emitting element 71 is an angle θ2.

By contrast, the configuration according to the embodiment illustrated in FIG. 7 includes the light-shielding wall 6. The light-shielding wall 6 is a partition that separates the light-emitting elements 71 adjacent to each other in the X direction and the light-emitting elements 71 adjacent to each other in the Y direction. The light-shielding wall 6 has a grid shape when viewed from the Z direction. The light-shielding wall 6 protrudes toward the Z1 side. The height of the light-shielding wall 6 is higher than that of the light-emitting element 71. The light-shielding wall 6 has a visible light absorbing property of absorbing at least part of visible light. As illustrated in FIG. 7, the light L1 is incident on the entire area of the divided region 82-1 and part of the divided region 82-2 in the embodiment. In other words, the light L1 illustrated in FIG. 8 reaches the divided region 82-3, but in the embodiment, the light L1 is blocked by the light-shielding wall 6 and does not reach the divided region 82-3. Similarly, the light L3 is incident on the entire area of the divided region 82-3, part of the divided region 82-2, and part of the divided region 82-4.

In the embodiment provided with the light-shielding wall 6, the irradiation angle of light emitted from the light-emitting element 71 is an angle θ1. The angle θ1 is smaller than the angle θ2. Thus, the light L emitted from one light-emitting element 71 is incident on one divided region 820 overlapping the one light-emitting element 71 in the X direction and another divided region 820 adjacent to the one divided region 820, and does not reach the other divided regions 820 because the light is blocked by the light-shielding wall 6. In other words, the angle θ2 is an angle of light incident on the region beyond the divided region 820 adjacent to a certain divided region 820, and the angle θ1 is an angle of light not incident on the region beyond the divided region 820 adjacent to the certain divided region 820.

Figure 9:
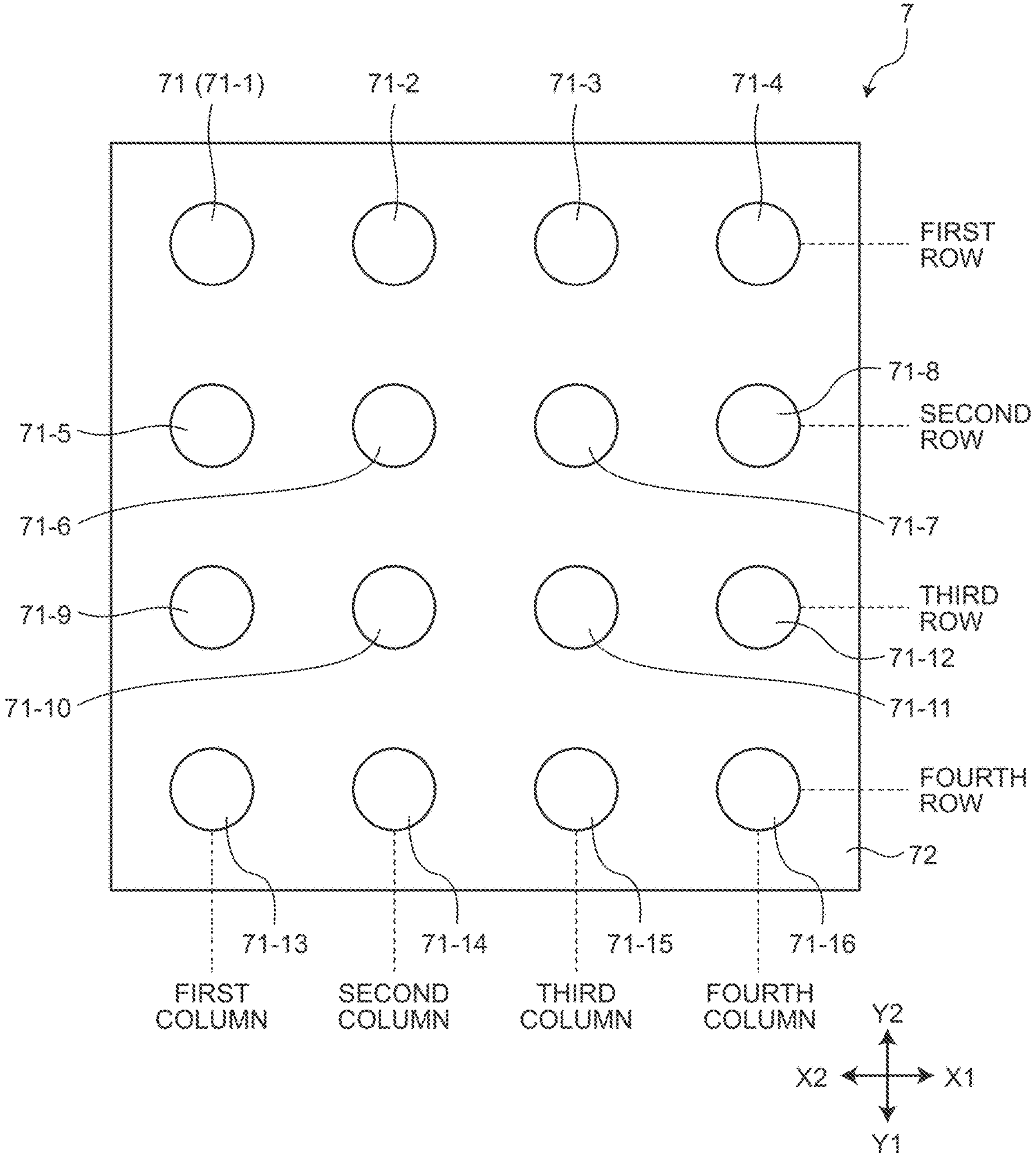
FIG. 9 is a schematic plan view of a light source device according to the embodiment.
Figure 10:
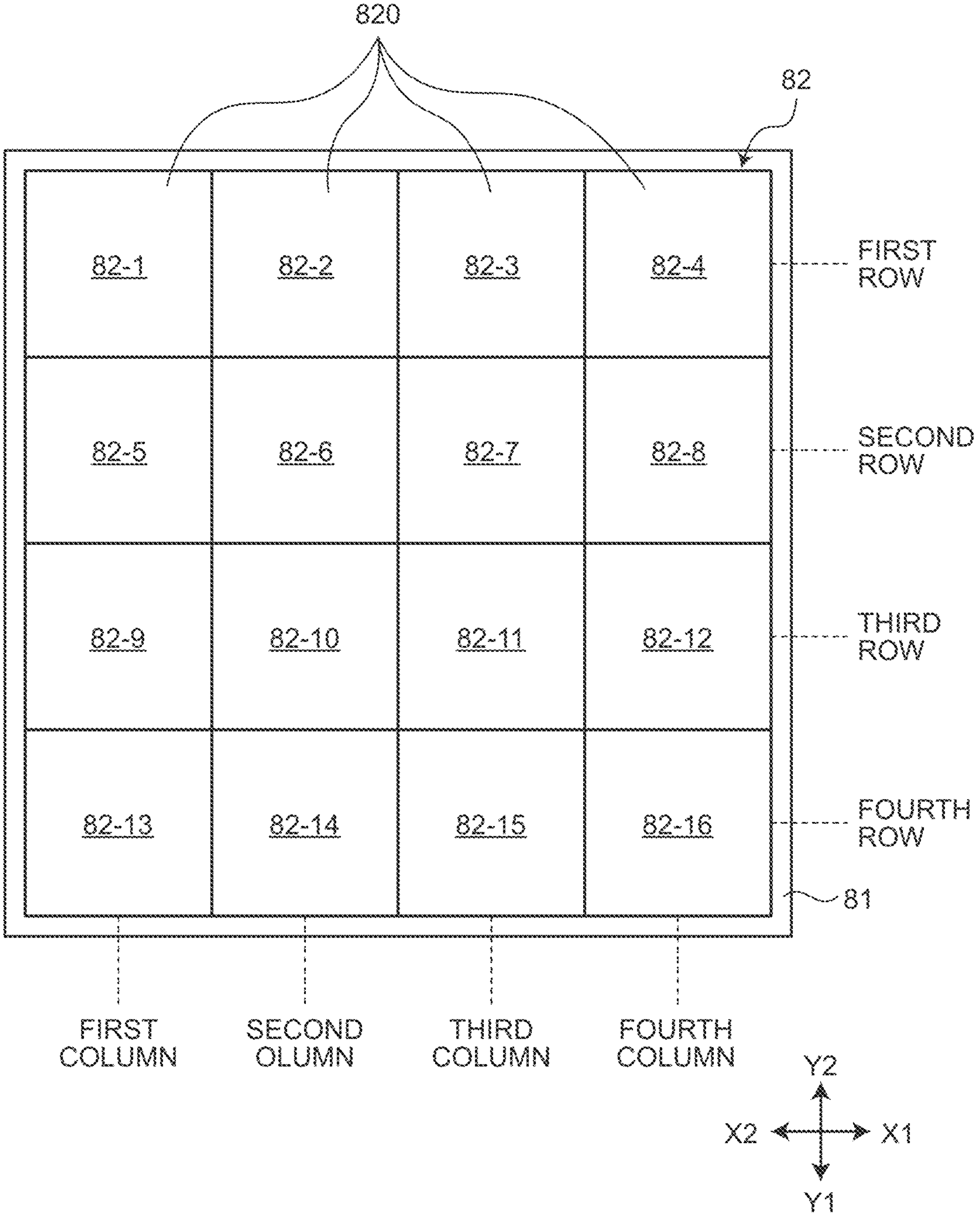
FIG. 10 is a schematic plan view of the liquid crystal shutter according to the embodiment.
Figure 11:
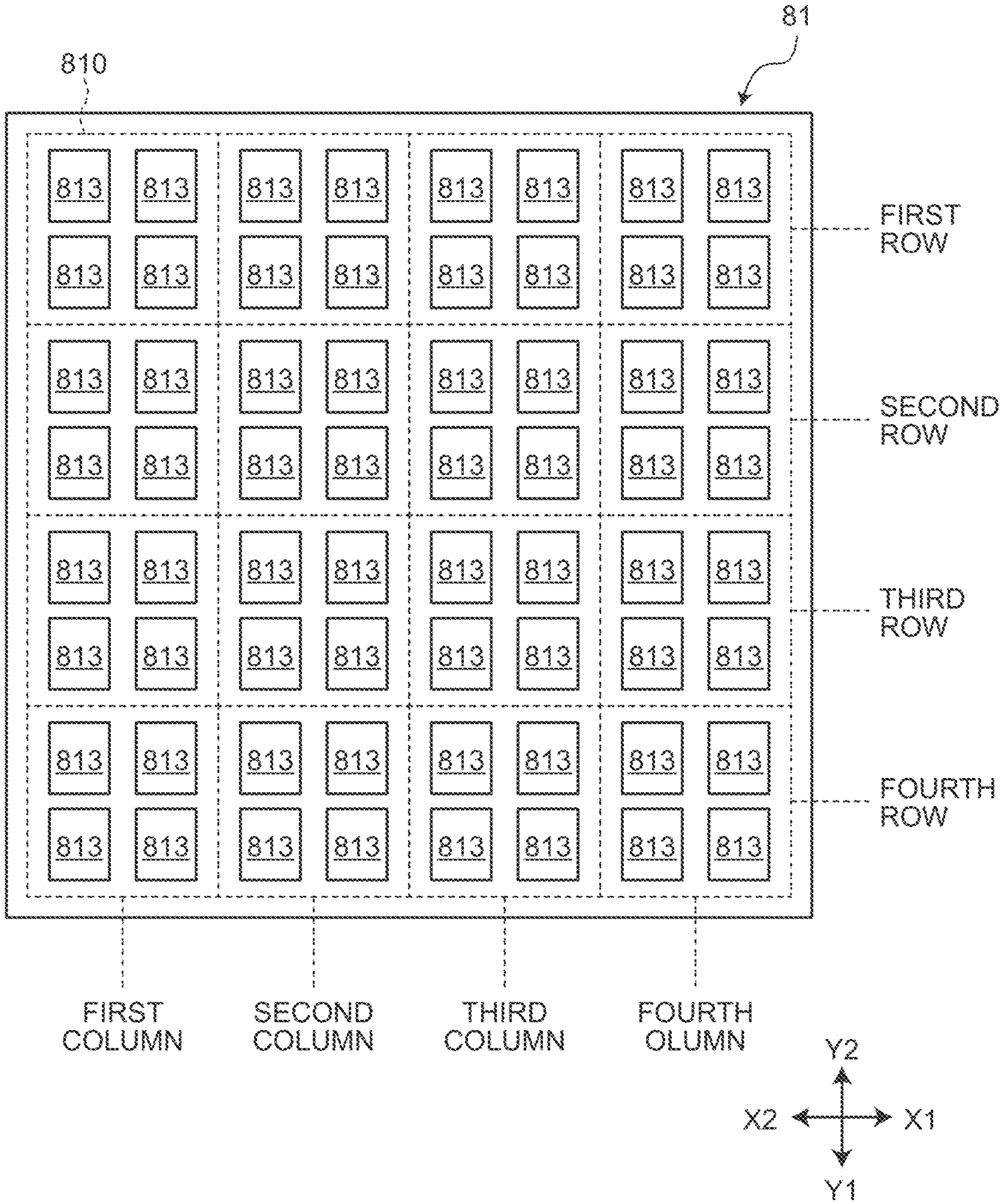
FIG. 11 is a schematic plan view of an optical sensor according to the embodiment.

FIG. 9 is a schematic plan view of the light source device according to the embodiment. FIG. 10 is a schematic plan view of the liquid crystal shutter according to the embodiment. FIG. 11 is a schematic plan view of the optical sensor according to the embodiment.

As illustrated in FIG. 9, a total of 16 light-emitting elements 71 according to the present embodiment are provided. The 16 light-emitting elements 71 can be switched between the lit state and the unlit state for each of the light-emitting elements 71. The 16 light-emitting elements 71 are arranged in a matrix (row-column configuration) at regular intervals in the X and Y directions as described above. Specifically, four rows along the X direction are arranged, and four columns along the Y direction are arranged. As for the rows, for example, the first row is positioned on the most Y2 side. In the first row, four light-emitting elements 71 are arranged at regular intervals from the X2 side to the X1 side. Specifically, light-emitting elements 71-1, 71-2, 71-3, and 71-4 are arranged from the X2 side to the X1 side. In the second row, four light-emitting elements 71 are arranged at regular intervals from the X2 side to the X1 side.

Specifically, light-emitting elements 71-5, 71-6, 71-7, and 71-8 are arranged from the X2 side to the X1 side. In the third row, four light-emitting elements 71 are arranged at regular intervals from the X2 side to the X1 side. Specifically, light-emitting elements 71-9, 71-10, 71-11, and 71-12 are arranged from the X2 side to the X1 side. In the fourth row, four light-emitting elements 71 are arranged at regular intervals from the X2 side to the X1 side. Specifically, light-emitting elements 71-13, 71-14, 71-15, and 71-16 are arranged from the X2 side to the X1 side.

As for the columns, for example, the first column is positioned on the most X2 side. In the first column, four light-emitting elements 71 are arranged at regular intervals from the Y2 side to the Y1 side. Similarly, in the second, the third, and the fourth columns, four light-emitting elements 71 are arranged at regular intervals from the Y2 side to the Y1 side.

As illustrated in FIG. 10, the liquid crystal shutter 82 according to the present embodiment is divided into a total of 16 parts in plan view seen in the Z direction. In other words, the liquid crystal shutter 82 has 16 divided regions 820 divided in the X and Y directions.

The light-emitting elements 71 can be switched between the lit state and the unlit state for each of the light-emitting elements 71. The divided region 820 overlapping the light-emitting element 71 in the lit state when viewed in the Z direction is brought into the light-transmitting state, and the divided region 820 overlapping the light-emitting element 71 in the unlit state when viewed in the Z direction is brought into the non-light-transmitting state.

The divided regions 820 adjacent to each other in the X or Y direction are arranged without a gap or with a slight gap interposed therebetween. All the divided regions 820 each have a square shape when viewed in the Z direction. The divided regions 820 are arranged in a matrix (row-column configuration) at regular intervals in the X and Y directions when viewed in the Z direction. The 16 divided regions 820 are arranged in a lattice pattern at regular intervals in the X and Y directions. Specifically, in the same manner as the arrangement of the light-emitting elements, four rows along the X direction are arranged, and four columns along the Y direction are arranged. As for the rows, for example, the first row is positioned on the most Y2 side. In the first row, four divided regions 820 are arranged at regular intervals from the X2 side to the X1 side. Specifically, divided regions 82-1, 82-2, 82-3, and 82-4 are arranged from the X2 side to the X1 side. In the second row, four divided regions 820 are arranged at regular intervals from the X2 side to the X1 side.

Specifically, divided regions 82-5, 82-6, 82-7, and 82-8 are arranged from the X2 side to the X1 side. In the third row, four divided regions 820 are arranged at regular intervals from the X2 side to the X1 side. Specifically, divided regions 82-9, 82-10, 82-11, and 82-12 are arranged from the X2 side to the X1 side. In the fourth row, four divided regions 820 are arranged at regular intervals from the X2 side to the X1 side. Specifically, divided regions 82-13, 82-14, 82-15, and 82-16 are arranged from the X2 side to the X1 side.

As for the columns, for example, the first column is positioned on the most X2 side. In the first column, four divided regions 820 are arranged at regular intervals from the Y2 side to the Y1 side. Similarly, in the second, the third, and the fourth columns, four divided regions 820 are arranged at regular intervals from the Y2 side to the Y1 side.

The divided region 820 according to the present disclosure does not necessarily have a square shape in plan view. Thus, the divided region 820 may have, for example, an equilateral triangular shape or a polygonal shape with five or more sides in plan view. The divided regions 820 that are simultaneously brought into the light-transmitting state are not adjacent to each other.

As illustrated in FIG. 11, one detection region 810 includes one or more photodetection elements 813 (photodiodes). While one detection region 810 according to the present embodiment includes four photodetection elements 813, the present disclosure is not limited thereto, and one detection region 810 may include three or less or five or more photodetection elements 813. The detection region 810 is arranged correspondingly to the divided region 820 of the liquid crystal shutter 82. Specifically, the outline of the detection region 810 overlaps the outline of the divided region 820 of the liquid crystal shutter 82 when viewed in the Z direction. Therefore, four photodetection elements 813 are disposed overlapping one divided region 820 of the liquid crystal shutter 82 when viewed in the Z direction.

The detection regions 810 are arranged in a matrix (row-column configuration) at regular intervals in the X and Y directions when viewed in the Z direction. The 16 detection regions 810 are arranged in a lattice pattern at regular intervals in the X and Y directions. Specifically, in the same manner as the arrangement of the light-emitting elements 71 and the divided regions 820 of the liquid crystal shutter 82, four rows along the X direction are arranged, and four columns along the Y direction are arranged. As for the rows, for example, the first row is positioned on the most Y2 side. In the first row, four detection regions 810 are arranged at regular intervals from the X2 side to the X1 side. In the second row, four detection regions 810 are arranged at regular intervals from the X2 side to the X1 side. In the third row, four detection regions 810 are arranged at regular intervals from the X2 side to the X1 side. In the fourth row, four detection regions 810 are arranged at regular intervals from the X2 side to the X1 side.

Figure 12A:
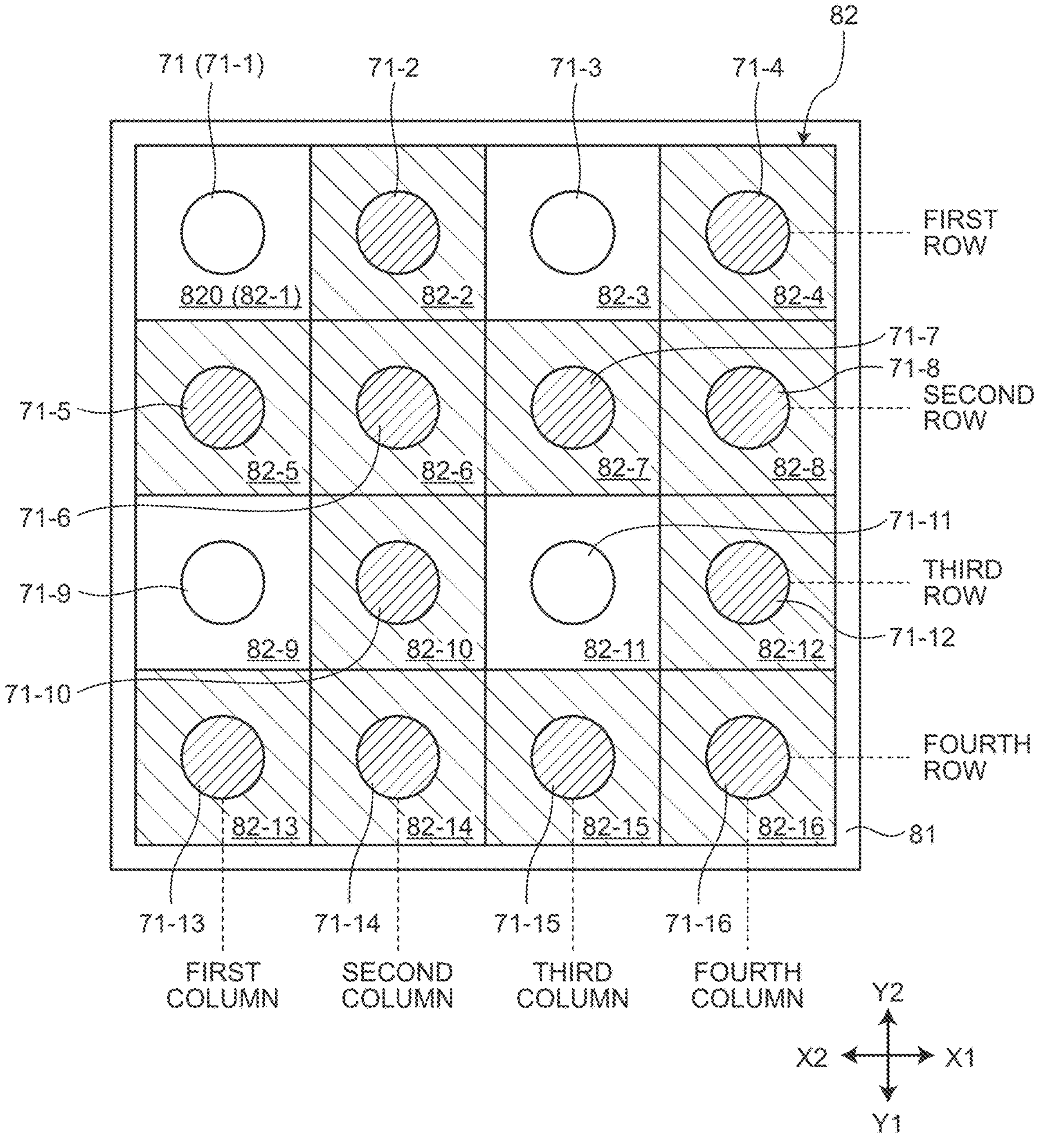
FIG. 12A is a schematic view illustrating a first process in which four divided regions included in a first divided region group are brought into a light-transmitting state.
Figure 12B:
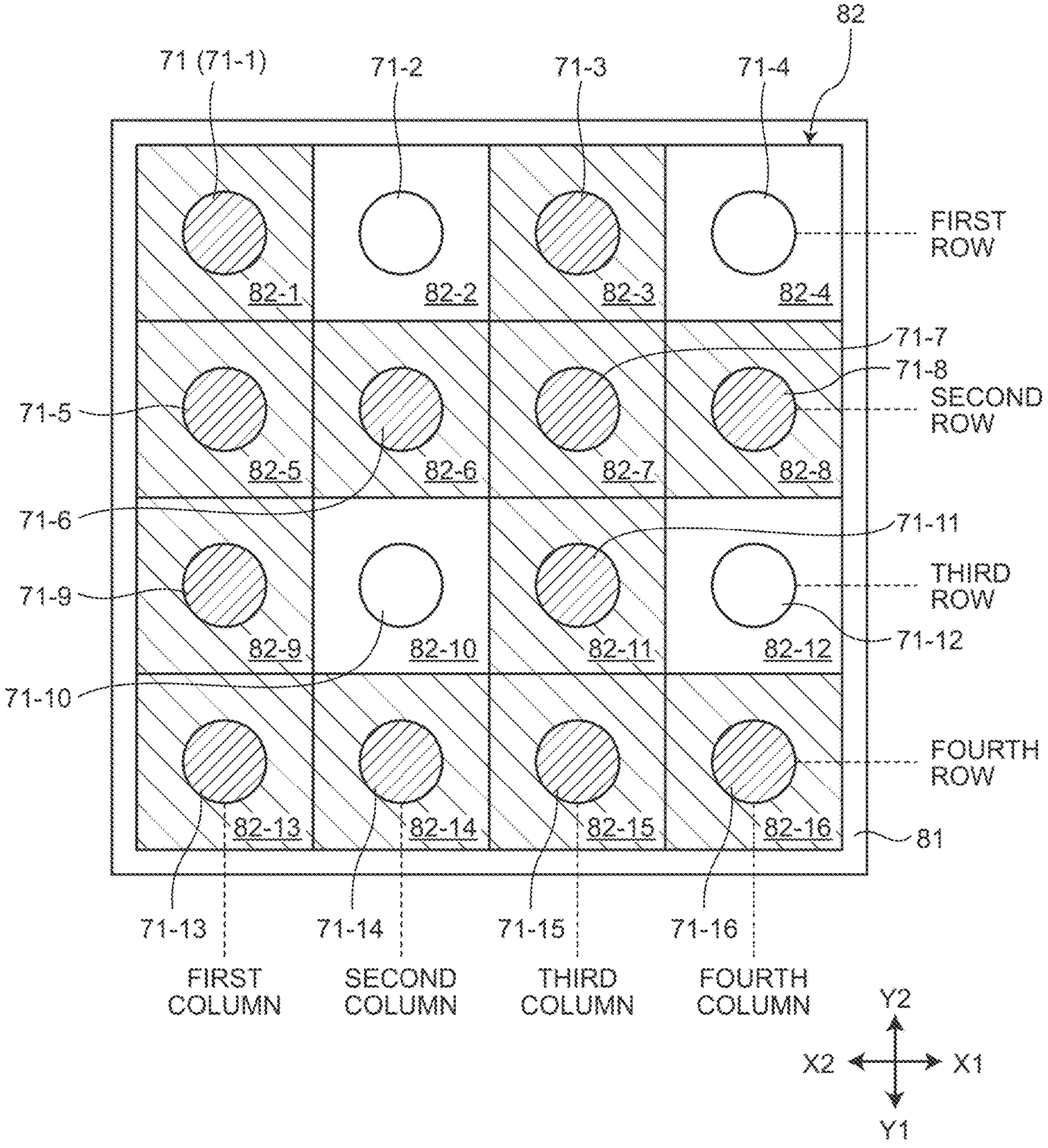
FIG. 12B is a schematic view illustrating a second process in which four divided regions included in a second divided region group are brought into the light-transmitting state.
Figure 12C:
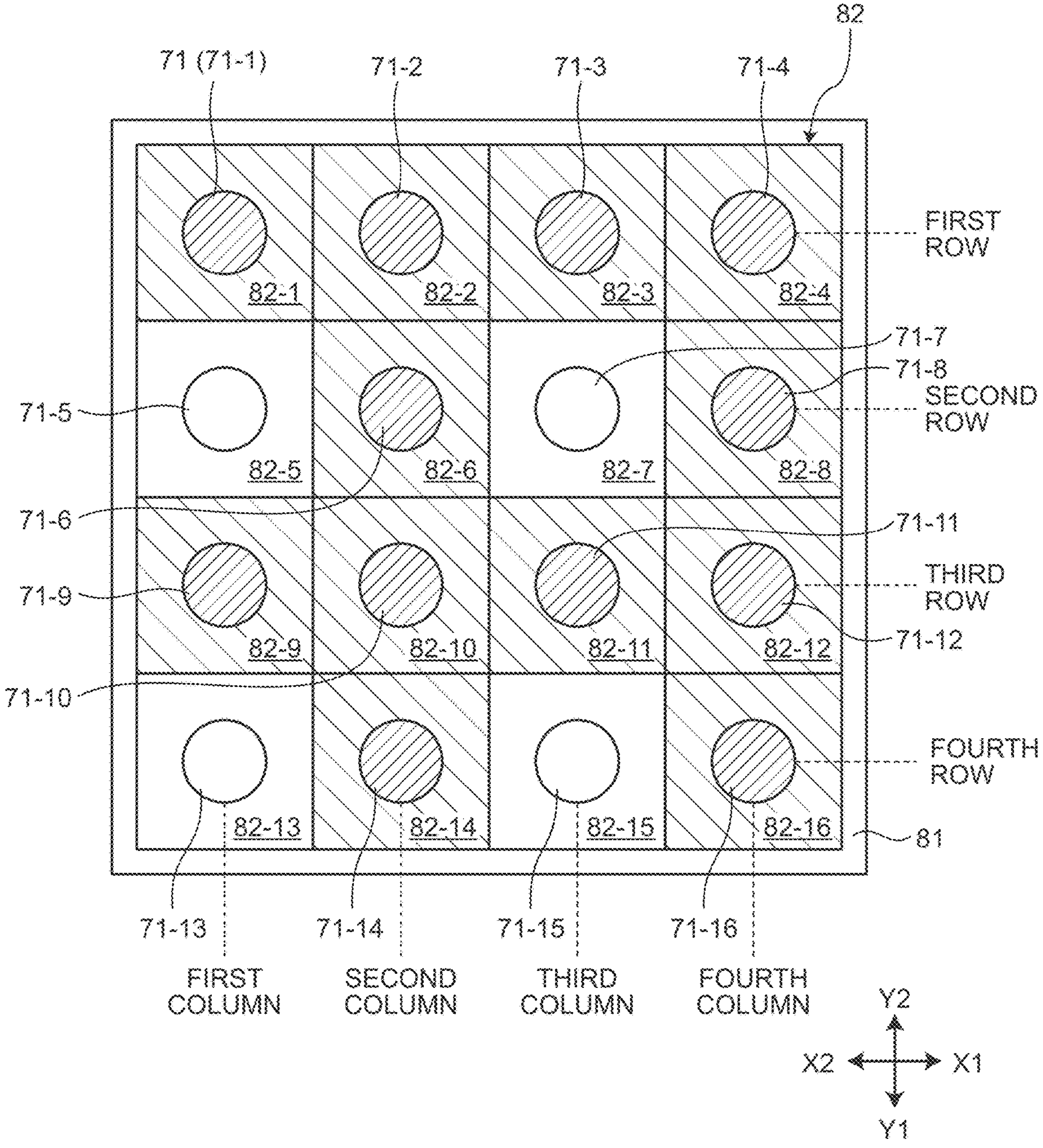
FIG. 12C is a schematic view illustrating a third process in which four divided regions included in a third divided region group are brought into the light-transmitting state.
Figure 12D:
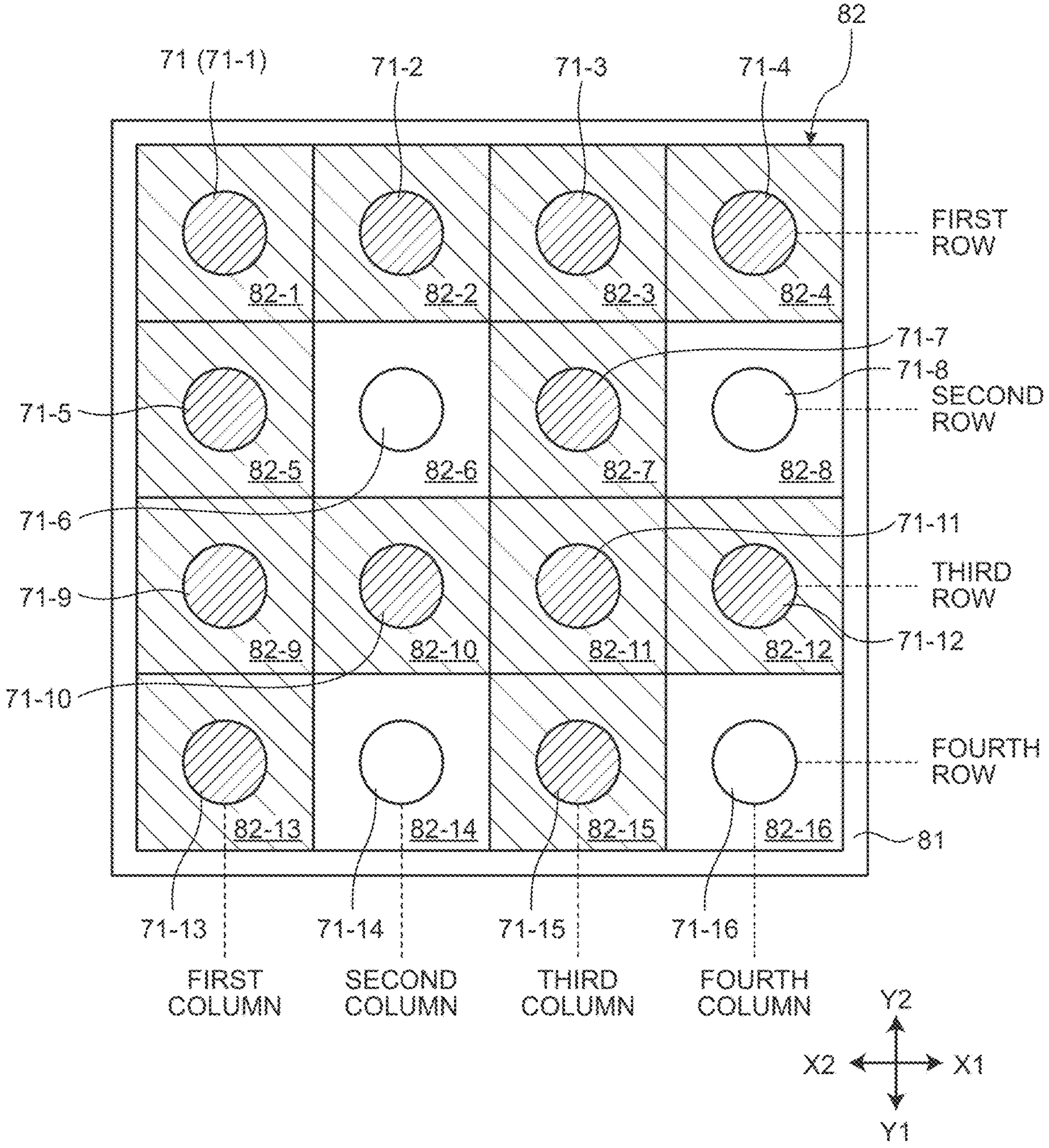
FIG. 12D is a schematic view illustrating a fourth process in which four divided regions included in a fourth divided region group are brought into the light-transmitting state.

The following describes the operating timing of the liquid crystal shutter 82 and the timings of the turning-on and -off of the light-emitting elements. FIG. 12A is a schematic view illustrating a first process in which four divided regions included in a first divided region group are brought into the light-transmitting state. FIG. 12B is a schematic view illustrating a second process in which four divided regions included in a second divided region group are brought into the light-transmitting state. FIG. 12C is a schematic view illustrating a third process in which four divided regions included in a third divided region group are brought into the light-transmitting state. FIG. 12D is a schematic view illustrating a fourth process in which four divided regions included in a fourth divided region group are brought into the light-transmitting state. The light-emitting elements 71 in the lit state are represented by hollow circles, while the light-emitting elements 71 in the unlit state are represented by hatched circles. The divided regions 820 in the light-transmitting state are represented by hollow squares, while the divided regions 820 in the non-light-transmitting state are represented by hatched squares.

The divided regions 820 of the liquid crystal shutter 82 and the light-emitting elements 71 are arranged in a matrix (row-column configuration) at regular intervals in the X and Y directions as described above. In the embodiment, the following process is performed four times (a plurality of times): four (predetermined number of 2 or more) divided regions 820 are brought into the light-transmitting state, and 12 (the number of remaining divided regions) divided regions 820 are brought into the non-light-transmitting state, wherein the number of 12 (the number of remaining divided regions) is calculated by subtracting 4 (predetermined number of 2 or more) from 16 (total number of divided regions). The above process is performed by changing the divided regions 820 to be brought into the light-transmitting state until all the 16 (total number of divided regions) divided regions 820 are brought into the light-transmitting state at least once. Specifically, the process is composed of the first process illustrated in FIG. 12A, the second process illustrated in FIG. 12B, the third process illustrated in FIG. 12C, and the fourth process illustrated in FIG. 12D.

As illustrated in FIG. 12A, the four divided regions included in the first divided region group are brought into the light-transmitting state in the first process. The four divided regions are the divided regions 82-1, 82-3, 82-9, and 82-11, and the other divided regions 820 are brought into the non-light-transmitting state. The light-emitting elements 71-1, 71-3, 71-9, and 71-10 are brought into the lit state, and the other light-emitting elements 71 are brought into the unlit state. As illustrated in FIG. 12A, the divided regions 820 that are simultaneously brought into the light-transmitting state are not adjacent to each other.

As illustrated in FIG. 12B, the four divided regions included in the second divided region group are brought into the light-transmitting state in the second process. The four divided regions are the divided regions 82-2, 82-4, 82-10, and 82-12, and the other divided regions 820 are brought into the non-light-transmitting state. The light-emitting elements 71-2, 71-4, 71-10, and 71-12 are brought into the lit state, and the other light-emitting elements 71 are brought into the unlit state. As illustrated in FIG. 12B, the divided regions 820 that are simultaneously brought into the light-transmitting state are not adjacent to each other.

As illustrated in FIG. 12C, the four divided regions included in the third divided region group are brought into the light-transmitting state in the third process. The four divided regions are the divided regions 82-5, 82-7, 82-13, and 82-15, and the other divided regions 820 are brought into the non-light-transmitting state. The light-emitting elements 71-5, 71-7, 71-13, and 71-15 are brought into the lit state, and the other light-emitting elements 71 are brought into the unlit state. As illustrated in FIG. 12C, the divided regions 820 that are simultaneously brought into the light-transmitting state are not adjacent to each other.

As illustrated in FIG. 12D, the four divided regions included in the fourth divided region group are brought into the light-transmitting state in the fourth process. The four divided regions are the divided regions 82-6, 82-8, 82-14, and 82-16, and the other divided regions 820 are brought into the non-light-transmitting state. The light-emitting elements 71-6, 71-8, 71-14, and 71-16 are brought into the lit state, and the other light-emitting elements 71 are brought into the unlit state. As illustrated in FIG. 12D, the divided regions 820 that are simultaneously brought into the light-transmitting state are not adjacent to each other.

Figure 13:
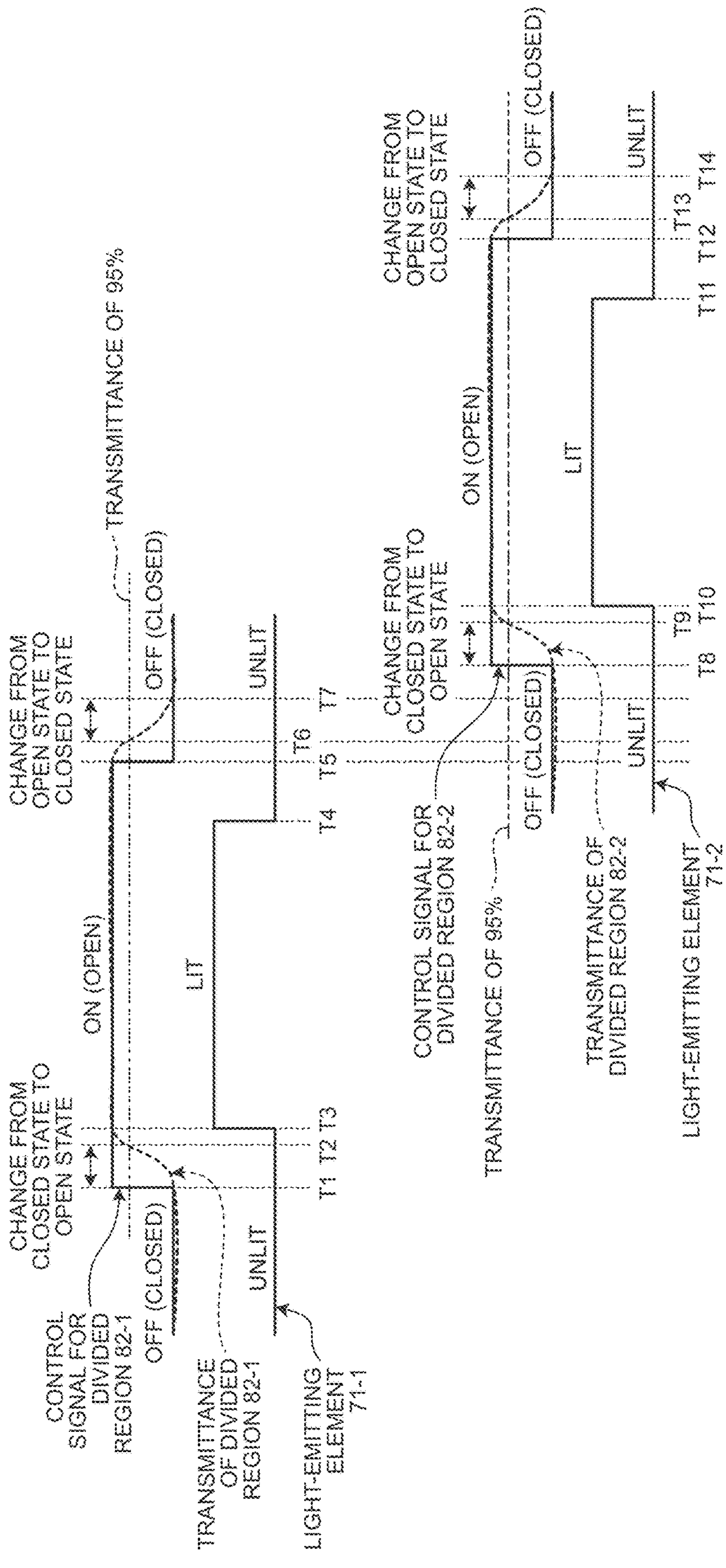
FIG. 13 is a schematic diagram illustrating an operating state of two light-emitting elements and two divided regions of the liquid crystal shutter adjacent to each other in an X direction.

FIG. 13 is a schematic diagram illustrating an operating state of two light-emitting elements and two divided regions of the liquid crystal shutter adjacent to each other in the X direction. In FIG. 13, the upper left diagram illustrates the turning-on and -off timings of the light-emitting element 71-1 (refer to FIG. 9) and the operating state of the divided region 82-1 (refer to FIG. 10) of the liquid crystal shutter 82. The light-emitting element 71-1 and the divided region 82-1 overlap when viewed in the Z direction. In FIG. 13, the lower right diagram illustrates the turning-on and -off timings of the light-emitting element 71-2 (refer to FIG. 9) and the operating state of the divided region 82-2 (refer to FIG. 10) of the liquid crystal shutter 82. The light-emitting element 71-2 and the divided region 82-2 overlap when viewed in the Z direction.

The control signal Sg (refer to FIG. 5) for instructing the shutter to open and close is indicated by a solid line, and the transmittance of the shutter is indicated by a dashed line. The highest transmittance of the liquid crystal shutter 82 is 100%, and the lowest transmittance is 0%. In the present embodiment, a transmittance of 95% is indicated by an alternate long and two short dashes line because a predetermined transmittance at which satisfactory detection accuracy can be obtained is 95% or higher.

First, the divided region 82-1 of the liquid crystal shutter 82 receives the control signal Sg (refer to FIG. 5) to open (turn on) the shutter at time T1 as indicated by the solid line. After the control signal Sg is received, the transmittance of the divided region 82-1 of the liquid crystal shutter 82 gradually increases. The transmittance reaches 95% at time T2 and is saturated near 100% at time T3. In the embodiment, a state where the transmittance is 95% or higher is the state where the liquid crystal shutter 82 is in the light-transmitting state (open state), and a state where the transmittance is lower than 58, for example, is the non-light-transmitting state (closed state). Therefore, the divided region 82-1 of the liquid crystal shutter 82 is brought into the light-transmitting state (open state) at time T2. The time length from time T1 to time T2 is determined in advance by experiment, for example. Thus, it is determined that the transmittance of the liquid crystal shutter 82 reaches 95% at the time when (time T2−time T1) has elapsed since time T1.

At time T3, the light-emitting element 71-1 shifts from the unlit state (off state) to the lit state. The light-emitting element 71-1 remains in the lit state from time T3 to time T4. At time T4, the light-emitting element 71-1 shifts to the unlit state.

When the control signal Sg to close (turn off) the shutter is received at time T5 after time T4, the transmittance of the divided region 82-1 of the liquid crystal shutter 82 gradually decreases from time T5. The transmittance of the divided region 82-1 reaches 95% at time T6 and is saturated near 0% at time T7. The transmittance reaches 95% at time T6, whereby the divided region 82-1 of the liquid crystal shutter 82 comes into the closed state at time T6. Time T7 is a timing at which all the divided regions 820 are in the non-light-transmitting state.

After time T7, the light-emitting element 71-2 is brought into the lit and unlit states, and the divided region 82-2 of the liquid crystal shutter 82 is brought into the open state. The changes between the lit and unlit states of the light-emitting element 71-2 are the same as those in the light-emitting element 71-1, and the open and closed states of the divided region 82-2 of the liquid crystal shutter 82 are the same as those in the divided region 82-1.

Specifically, the divided region 82-2 of the liquid crystal shutter 82 first receives the control signal Sg to open (turn on) the shutter at time T8 as indicated by the solid line. After the control signal Sg is received, the transmittance of the divided region 82-2 of the liquid crystal shutter 82 gradually increases. The transmittance reaches 95% at time T9 and is saturated near 100% at time T10.

At time T10, the light-emitting element 71-2 shifts from the unlit state (off state) to the lit state. The light-emitting element 71-2 remains in the lit state from time T10 to time T11. At time T11, the light-emitting element 71-2 shifts to the unlit state.

When the control signal Sg to close (turn off) the shutter is received at time T12 after time T11, the transmittance of the divided region 82-2 gradually decreases from time T12. The transmittance reaches 95% at time T13 and is saturated near 0% at time T14.

The divided region 82-1 is brought into the light-transmitting state in the first process illustrated in FIG. 12A, and the divided region 82-2 is brought into the light-transmitting state in the second process illustrated in FIG. 12B. The divided regions 82-1 and 82-2 are adjacent to each other in the X direction. Time T7 is the timing at which all the divided regions 820 are in the non-light-transmitting state. Thus, the divided region 82-1 that is brought into the light-transmitting state in the first process (certain process) out of the four times (a plurality of times) is adjacent to the divided region 82-2 that is brought into the light-transmitting state in the second process (next process following the certain process) in the present embodiment, and the timing at which all the divided regions 820 are in the non-light-transmitting state is provided between the first process and the second process.

Figure 14:
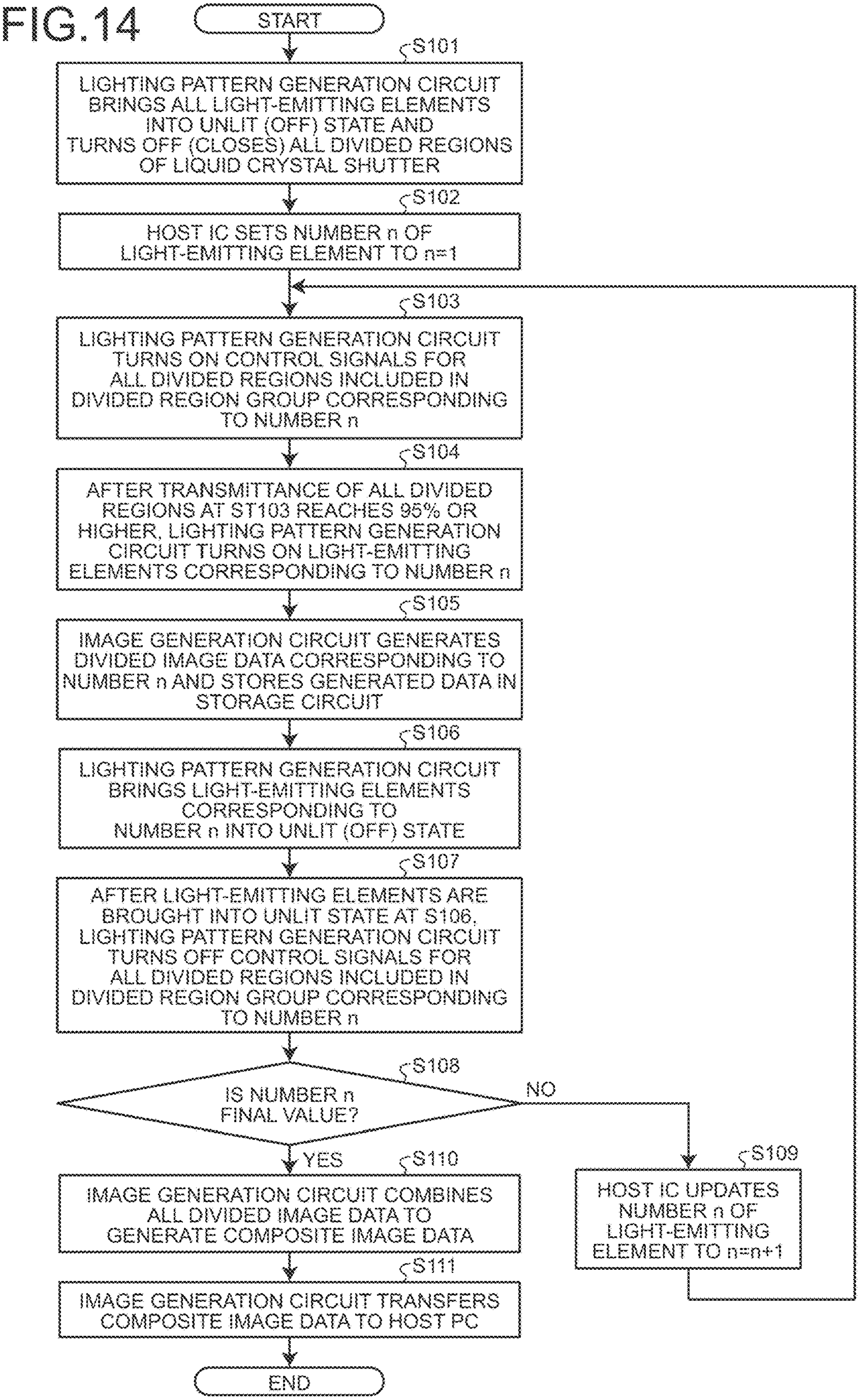
FIG. 14 is a flowchart illustrating a detection operation example of the detection device according to the embodiment.

The following describes a detection operation example of the detection device. FIG. 14 is a flowchart illustrating the detection operation example of the detection device according to the embodiment.

First, the lighting pattern generation circuit 754 (refer to FIG. 5) brings all the light-emitting elements 71 into the unlit (off) state and turns off (closes) all the divided regions 820 of the liquid crystal shutter 82 at Step S101. As a result, all the 16 light-emitting elements 71 illustrated in FIG. 9 are in the unlit state, and all the 16 divided regions 820 illustrated in FIG. 10 are in the off state.

Subsequently, the host IC 75 (refer to FIG. 5) sets the number n of the light-emitting element 71 to 1 (n=1) (Step S102).

Then, the lighting pattern generation circuit 754 turns on the control signals for all the divided regions 820 included in the divided region group corresponding to the number n (Step S103). Specifically, as described with reference to FIG. 12A, the lighting pattern generation circuit 754 turns on the control signals for the four divided regions (divided regions 82-1, 82-3, 82-9, and 82-11) included in the first divided region group in the first process. As a result, the divided region 82-1, for example, receives the control signal Sg to open (turn on) the shutter at time T1 as described with reference to FIG. 13.

Subsequently, after the transmittance of all the divided regions included in the first divided region group subjected to the process at Step S103 reaches 95% or higher, the lighting pattern generation circuit 754 turns on the light-emitting elements 71 corresponding to the number n (Step S104). All the divided regions included in the first divided region group subjected to the process at Step S103 are specifically the divided regions 82-1, 82-3, 82-9, and 82-11. As a result, the light-emitting element 71-1, for example, shifts from the unlit state (off state) to the lit state at time T3 as described with reference to FIG. 13.

Then, the image generation circuit 756 (refer to FIG. 5) generates a plurality of pieces of divided image data of the divided regions 820 included in the divided region group corresponding to the number n and stores the generated data in the storage circuit 757 (Step S105). As a result, the divided image data corresponding to all the divided regions 820 included in the first divided region group, for example, are generated and stored.

Subsequently, the lighting pattern generation circuit 754 brings the light-emitting elements 71 corresponding to the number n into the unlit state (Step S106). Specifically, the light-emitting elements that overlaps the divided regions 820 included in the first divided region group when viewed in the Z direction are changed from the lit state to the unlit state at time T4 described with reference to FIG. 13.

After the light-emitting elements 71 are brought into the unlit state at Step S106, the lighting pattern generation circuit 754 turns off the control signals for all the divided regions 820 included in the divided region group corresponding to the number n (Step S107). Specifically, when the control signals Sg to close (turn off) the shutters of all the divided regions 820 included in the first divided region group are received at time T5 after time T4 described with reference to FIG. 13, the transmittance of all the divided regions 820 gradually decreases from time T5.

The host IC 75 determines whether the number n is the final value (Step S108). If the number n is not determined to be the final value, the host IC updates the number n of the light-emitting element to n+1 (n=n+1) (Step S109). For example, the host IC 75 updates n=1 to n=2, and the lighting pattern generation circuit 754 performs the processing at Step S103 again. The case of n=2 corresponds to the second process according to the present embodiment.

Then, the processing from Step S103 to Step S107 is performed, and the host IC 75 determines whether the number n is the final value again (Step S108), and the processing is repeated until the number n is determined to be the final value. In the present embodiment, the third process and the fourth process are performed after the second process. In other words, the process is performed by changing the divided regions 820 to be brought into the light-transmitting state until all the 16 divided regions 820 are brought into the light-transmitting state at least once.

If the host IC 75 determines that the number n is the final value (Step S108), the image generation circuit 756 combines all the divided image data to generate composite image data (Step S110). As a result, the composite image data corresponding to all the divided regions 820 of the liquid crystal shutter 82 is generated. The image generation circuit 756 transfers the composite image data to the host PC 758 (Step S111).

As described above, the detection device 100 includes the light source device 7, the object placement member 110 with a light-transmitting property, the liquid crystal shutter 82 having a plurality of divided regions 820, and the optical sensor 81 having a plurality of detection regions 810. The divided regions 820 in the liquid crystal shutter 82 can be switched between the light-transmitting state and the non-light-transmitting state for each of the divided regions 820, and the light-emitting elements 71 can be switched between the lit state and the unlit state for each of the light-emitting elements 71. The respective light-emitting elements 71, the respective divided regions 820 of the liquid crystal shutter 82, and the respective detection regions 810 overlap when viewed in the Z direction. The light source device 7 includes the light-shielding wall 6 disposed between two adjacent light-emitting elements 71 out of the light-emitting elements 71.

As described above, if a plurality of light-emitting elements 71 are provided, one object to be detected 114 is irradiated with light rays in different directions emitted from the light-emitting elements 71, which may blur an image captured by the optical sensor 81.

By contrast, in the present embodiment, the respective light-emitting elements 71, the respective divided regions 820 of the liquid crystal shutter 82, and the respective detection regions 810 of the optical sensor 81 overlap when viewed in the Z direction. In addition, the light-shielding wall 6 is provided between two adjacent light-emitting elements 71. Therefore, by turning on one light-emitting element 71 and bringing the divided region 820 arranged overlapping the one light-emitting element 71 into the light-transmitting state, the detection device 100 prevents a plurality of light rays L from being incident on the detection region 810 arranged overlapping the divided region 820 in the light-transmitting state.

By providing the light-shielding wall 6 between two adjacent light-emitting elements 71, part of the light L emitted from one light-emitting element 71 is blocked by the light-shielding wall 6. This configuration further prevents a plurality of light rays L from being incident on the divided region 820 and the detection region 810 arranged overlapping the one light-emitting element 71. Therefore, the detection device 100 can further reduce blurring of the image captured by the optical sensor 81.

The divided region 820 that overlaps the light-emitting element 71 in the lit state when viewed in the Z direction is brought into the light-transmitting state, and the divided region 820 that overlaps the light-emitting element 71 in the unlit state when viewed in the Z direction is brought into the non-light-transmitting state.

This configuration can turn on one light-emitting element 71, bring one divided region 820 arranged overlapping the one light-emitting element 71 into the light-transmitting state, and bring the divided regions 820 adjacent to the one divided region 820 into the non-light-transmitting state. Therefore, the light L transmitted through the divided region 820 in the light-transmitting state and reaching the detection region 810 is limited to the light L emitted from the one light-emitting element 71. With this configuration, the detection device 100 can further reduce blurring of the image captured by the optical sensor 81.

Four (predetermined number of 2 or more) divided regions 820 are brought into the light-transmitting state, and the remaining 12 divided regions 820 are brought into the non-light-transmitting state, wherein the number of 12 (the number of remaining regions) is calculated by subtracting 4 (predetermined number of 2 or more) from 16 (total number of divided regions 820).

In other words, a process is performed in which four divided regions 820 out of the 16 divided regions 820 are simultaneously brought into the light-transmitting state. Thus, all the (16) divided regions 820 can be brought into the light-transmitting state by four processes. Therefore, the detection device 100 can bring all the (16) divided regions 820 into the light-transmitting state in a smaller number of processes than in a case where only one divided region 820 is brought into the light-transmitting state in one process, for example.

The divided regions 820 that are simultaneously brought into the light-transmitting state are not adjacent to each other.

Therefore, when one light-emitting element 71 is turned on, and the divided region 820 arranged overlapping the one light-emitting element 71 is brought into the light-transmitting state, the light L transmitted through the divided region 820 in the light-transmitting state and reaching the detection region 810 is limited to the light L emitted from the one light-emitting element 71. With this configuration, the detection device 100 can further reduce blurring of the image captured by the optical sensor 81.

The light L emitted from one light-emitting element 71 is incident on one divided region 820 overlapping the one light-emitting element 71 when viewed in the Z direction and another divided region 820 adjacent to the one divided region 820, and is blocked by the light-shielding wall 6 such that the light does not reach the other divided regions 820.

Thus, part of the light L emitted from one light-emitting element 71 is blocked by the light-shielding wall 6. This configuration further prevents a plurality of light rays L from being incident on the divided region 820 and the detection region 810 overlapping the one light-emitting element 71 when viewed in the Z direction. Therefore, the detection device 100 can further reduce blurring of the image captured by the optical sensor 81. Examples of being adjacent herein include being adjacent in the X direction, adjacent in the Y direction, and adjacent in the XY direction (i.e., adjacent diagonally). For example, the divided regions adjacent to the divided region 82-6 in the X direction are the divided regions 82-5 and 82-7. The divided regions adjacent to the divided region 82-6 in the Y direction are the divided regions 82-2 and 82-10. The divided regions adjacent to the divided region 82-6 in the XY direction are the divided regions 82-1, 82-3, 82-9, and 82-11.

The light-emitting elements 71, the divided regions 820, and the detection regions 810 are arranged in a matrix (row-column configuration) along the X direction (second direction) intersecting the Z direction (first direction) and the Y direction (third direction) intersecting the Z and X directions. The following process is performed four times: four divided regions 820 are brought into the light-transmitting state, and the remaining 12 divided regions 820 are brought into the non-light-transmitting state, wherein the number of 12 (the number of remaining divided regions) is calculated by subtracting 4 (predetermined number of 2 or more) from 16 (total number of divided regions). The process is performed by changing the divided regions 820 to be brought into the light-transmitting state until all of the 16 divided regions 820 are brought into the light-transmitting state at least once.

Therefore, in the present embodiment, all the (16) divided regions 820 can be brought into the light-transmitting state in four processes. By contrast, in an aspect where only one divided region 820 is brought into the light-transmitting state in one process, for example, 16 processes are required to bring the 16 divided regions 820 into the light-transmitting state.

Therefore, in the present embodiment, all the (16) divided regions 820 can be brought into the light-transmitting state in a smaller number of processes.

The divided region 82-1 that is brought into the light-transmitting state in the first process (certain process) out of the processes of the four times (a plurality of times) described above and the divided region 82-2 that is brought into the light-transmitting state in the second process (next process) are adjacent to each other in the X direction. The timing (time T7 and time T8) at which all the divided regions 820 are in the non-light-transmitting state is provided between the first process and the second process.

In other words, the divided region 82-1 is brought into the non-light-transmitting state before the divided region 82-2 is brought into the light-transmitting state. Therefore, the light L that reaches the divided region 82-2 is limited to the light L emitted from the light-emitting element 71-2, thereby further reducing blurring of the image captured by the optical sensor 81.

The light-emitting element 71 is brought into the lit state when the transmittance of the divided region 820 in the light-transmitting state is equal to or higher than a predetermined value with respect to the maximum transmittance. The predetermined value is, for example, 95%.

Specifically, as described with reference to FIG. 13, the period during which the transmittance of the divided region 82-1 is equal to or higher than a predetermined value of 95% is from time T2 to time T6. In the period from time T2 to time T6, the light-emitting element 71-1 is in the lit state. In other words, when the light-emitting element 71-1 is in the lit state, the divided region 82-1 is in the light-transmitting state, and the divided regions 820 adjacent to the divided region 82-1 are in the non-light-transmitting state. This configuration prevents a plurality of light rays from being incident on one detection region 810, thereby further reducing blurring of the image captured by the optical sensor 81.

After one light-emitting element 71 is brought into the unlit state, the transmittance of one divided region 820 overlapping the one light-emitting element 71 when viewed in the Z direction starts to decrease.

Specifically, referring to FIG. 13, the time at which the light-emitting element 71-1 is brought into the unlit state is time T4. The time at which the transmittance of the divided region 82-1 starts to decrease is time T5. Time T5 comes after time T4. In other words, whenever the light-emitting element 71-1 is in the unlit state, the divided region 82-1 is in the non-light-transmitting state. This configuration prevents a plurality of light rays from being incident on one detection region 810, thereby further reducing blurring of the image captured by the optical sensor 81.

What is claimed is:

1. A detection device comprising:

a light source device comprising a plurality of light-emitting elements arranged in a plane;

an object placement member with a light-transmitting property disposed overlapping the light source device on a first side in a first direction and on which an object to be detected is placed;

a liquid crystal shutter that is disposed overlapping the object placement member on the first side in the first direction and has a plurality of divided regions arranged in a plane; and an optical sensor that is disposed overlapping the liquid crystal shutter on the first side in the first direction and has a plurality of detection regions arranged in a plane, wherein one of the detection regions includes one or more photodetection elements, the light source device comprises a light-shielding wall disposed between two adjacent light-emitting elements out of the light-emitting elements, the divided regions in the liquid crystal shutter are each capable of being switched between a light-transmitting state and a non-light-transmitting state for each of the divided regions, and the light-emitting elements are each capable of being switched between a lit state and an unlit state for each of the light-emitting elements, and the respective light-emitting elements, the respective divided regions of the liquid crystal shutter, and the respective detection regions overlap when viewed in the first direction.

2. The detection device according to claim 1, wherein the divided region overlapping the light-emitting element in the lit state when viewed in the first direction out of the divided regions is brought into the light-transmitting state, and the divided region overlapping the light-emitting element in the unlit state when viewed in the first direction is brought into the non-light-transmitting state.

3. The detection device according to claim 2, wherein a predetermined number of 2 or more of divided regions are brought into the light-transmitting state, and the remaining divided regions are brought into the non-light-transmitting state, the number of the remaining divided regions being calculated by subtracting the predetermined number from the total number of the divided regions.

4. The detection device according to claim 3, wherein the divided regions that are simultaneously brought into the light-transmitting state are not adjacent to each other.

5. The detection device according to claim 4, wherein light emitted from one light-emitting element is incident on one divided region overlapping in the first direction with the one light-emitting element and another divided region adjacent to the one divided region, and is blocked by the light-shielding wall such that the light does not reach the other divided regions.

6. The detection device according to claim 3, wherein the light-emitting elements, the divided regions, and the detection regions are arranged in a matrix having a row-column configuration along a second direction intersecting the first direction and a third direction intersecting the first direction and the second direction, a process is performed a plurality of times, in which the predetermined number of 2 or more of the divided regions are brought into the light-transmitting state and the remaining divided regions are brought into the non-light-transmitting state, the number of the remaining divided regions being calculated by subtracting the predetermined number from the total number of the divided regions, and the process is performed by changing the divided regions to be brought into the light-transmitting state until all of the divided regions are brought into the light-transmitting state at least once.

7. The detection device according to claim 6, wherein the divided region that is brought into the light-transmitting state in a certain process out of the processes of the plurality of times is adjacent to the divided region that is brought into the light-transmitting state in a next process following the certain process, and a timing at which all the divided regions are in the non-light-transmitting state is provided between the certain process and the next process.

8. The detection device according to claim 5, wherein the one light-emitting element is brought into the lit state when the transmittance of the one divided region in the light-transmitting state is equal to or higher than a predetermined value with respect to a maximum transmittance.

9. The detection device according to claim 8, wherein the transmittance of the one divided region starts to decrease after the one light-emitting element is brought into the unlit state.

10. The detection device according to claim 8, wherein the predetermined value is 95%.

* * * * *